(12) United States Patent
Akimoto

(10) Patent No.: US 8,614,819 B2
(45) Date of Patent: Dec. 24, 2013

(54) RECORDING MEDIUM STORING SCREEN CONTROLLING PROGRAM, DELIVERY SYSTEM AND SCREEN CONTROLLING METHOD

(75) Inventor: Yuya Akimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 337 days.

(21) Appl. No.: 13/096,219

(22) Filed: Apr. 28, 2011

(65) Prior Publication Data

US 2011/0286039 A1 Nov. 24, 2011

(30) Foreign Application Priority Data

May 24, 2010 (JP) ................................. 2010-118456

(51) Int. Cl.
*G06F 3/12* (2006.01)
*G06K 15/00* (2006.01)

(52) U.S. Cl.
USPC ........ 358/1.15; 358/1.16; 358/1.18; 358/1.13

(58) Field of Classification Search
None
See application file for complete search history.

(56) References Cited

U.S. PATENT DOCUMENTS

| 2008/0068638 A1 | 3/2008 | Yagi | |
|---|---|---|---|
| 2009/0190166 A1* | 7/2009 | Nakamura et al. | 358/1.15 |
| 2009/0235173 A1 | 9/2009 | Ichihara | |
| 2010/0253964 A1* | 10/2010 | Isshiki | 358/1.14 |

FOREIGN PATENT DOCUMENTS

| JP | 2008-097586 | 4/2008 |
|---|---|---|
| JP | 2009-169463 | 7/2009 |
| JP | 2009-260906 | 11/2009 |
| JP | 2010-061337 | 3/2010 |
| JP | 2010-074290 | 4/2010 |
| JP | 2010-219895 | 9/2010 |

* cited by examiner

*Primary Examiner* — Dov Popovici
(74) *Attorney, Agent, or Firm* — IPUSA, PLLC

(57) ABSTRACT

A screen controlling program representing a sequence of instructions including outputting an acquisition request of a contents type, included in one or plural bibliographic information pieces which are defined in a storage destination of image data indicated by a storage information piece, to a document controlling server if the storage information is received from an image forming apparatus; generating, if the one or plural contents types are received from the document controlling server, selection screen data for selecting the received contents types; sending the generated selection screen data to the image forming apparatus; generating setup screen data for setting one or plural bibliographic information pieces included in the selected contents type if the selected contents type is received from the image forming apparatus; and sending the generated setup screen data to the image forming apparatus.

3 Claims, 25 Drawing Sheets

FIG.9

Properties

Required Entry ○ Yes ● No

Send to SharePoint

Display Name * [SharePoint] ~900

Add/Delete StartPoint Path

[Add] ~904    [Edit] ~901    [Delete] ~902

| | Display Name | URL | Library |
|---|---|---|---|
| * | | | |
| ☑ | may | http://133.139.x.xxx | DOCUMENT ~903 |

[OK]   [Cancel]

FIG.10

Add StartPoint Path

General Settings

- Display Name * [Server_A] ~1001
- URL * [http://133.139.xxx.xxx/] 
- Authentication Method * [Proxy User ▼] ~1003
  - User Name * [user_A] ~1004
  - Password * [********] ~1005
  - [Connect] ~1006
- Create a Subfolder ☐ Enable Subfolder Delivery
  - Folder Prefix(Name)
  - ⦿ Select from Existing Metadata  [Document Name ▼]
  - ○ Manual Entry  [          ]
  - ☐ Add Suffix to Folder Name
- File Naming Rules * ⦿ Select from Existing Metadata  [Document Name ▶]
  - ○ Manual Entry  [          ]

[OK]  [Cancel]

~1002 (pointing to Authentication Method area)

FIG.15

ToSps
Send to SharePoint
SELECT DELIVERY DESTINATION AND PUSH START KEY

TOP SCREEN  OK

FULL NAME [Text]

CITY/ADDRESS (HOME) [Text]

COUNTRY/REGION [Text]

COMPANY NAME [Text]

IDENTIFICATION TYPE [Choice]  DRIVER'S LICENSE  ▶

Back to FolderSelector  Back  Next

FIG.19A

| DATA TYPE | EXPLANATION OF DATA TYPE | RULE OF DATA TYPE | ACTION IF RULE IS UN-OBSERVED | USER INTER-FACE (UI) CORRESPOND-ING TO DATA TYPE | RESTRIC-TION | INPUT RULE | ETC. |
|---|---|---|---|---|---|---|---|
| ONE-LINE TEXT | CHARACTER STRING | 255 LETTERS OR LESS | | EditBox | NON | 255 LETTERS OR LESS | |
| PLURAL-LINE TEXTS | CHARACTER STRING WIDTH LINE FEED | 1000 LINES OR LESS | | EditBox | NO LINEFEED | 255 LETTERS OR LESS | |
| OPTION | SELECT FROM SET-UP LIST. | NO LIMIT | STORE AS IS | ComboBox | NON | | |
| OPTION (SUPPLE-MENT) | SELECT FROM SET-UP LIST. OPTION CAN BE ADDED. | SELECT FROM SETUP LIST | | ComboBox | NO ADDI-TIONAL OPTION | | |
| NUMERIC VALUE | NUMERIC CHARACTER STRING (PERCENT CAN BE DISPLAYED) | MIN AND MAX VALUES CAN BE SET | STORE AS IS | EditBox | | ACCEPT ONLY NUMERIC FORMAT | DISPLAY PERCENT ON LABEL |
| | | NUMBER OF DECIMALS CAN BE LIMITED (0~5) | AUTO-MATICALLY ROUND (HALF ADJUST) | | | | |
| | | NUMERIC FORMAT ONLY (NUMBER, PERIOD, COMMA) | | | | | |

FIG.19B

| DATA TYPE | | EXPLANATION OF DATA TYPE | RULE OF DATA TYPE | ACTION IF RULE IS UN-OBSERVED | USER INTER-FACE (UI) CORRESPOND-ING TO DATA TYPE | RESTRIC-TION | INPUT RULE | ETC. |
|---|---|---|---|---|---|---|---|---|
| CURRENCY | | CURRENCY CHARACTER (STRING DELIMINATED EVERY TRIPLE DIGITS) DISPLAY SELECTED CURRENT MARK. | MIN AND MAX VALUES CAN BE SET | STORE AS IS | EditBox | | ACCEPT ONLY NUMERIC FORMAT | DISPLAY CURRENCY MARK ON LABEL |
| | | | NUMBER OF DECIMALS CAN BE LIMITED (0~5) | AUTO-MATICALLY ROUND (HALF ADJUST) | | | | |
| | | | NUMERIC FORMAT ONLY (NUMBER, PERIOD, COMMA) | | | | | |
| DATE AND TIME | | DATE CHARACTER STRING (REGION CAN BE SELECTED.) GREGORIAN, ISLAMIC, TIME ZONE ETC. | 1/1/1900~ 12/31/8900 | DELIVERY IM-POSSIBLE | DateField | NO DESIG-NATION OF TIME | NON | |
| | | | (YY)YY/MM/DD (hh:mm) | | | | | |
| REFER-ENCE | | POINT FIELD IN SAME SITE | | | N/A | | | |
| YES/NO | | BOOLEAN | "true", "false", "0", "1" | | RadioButton Group | | | |
| USER OR GROUP | | SELECTION FROM SPS USER LIST | | | N/A | | | |

FIG.19C

| DATA TYPE | EXPLANATION OF DATA TYPE | RULE OF DATA TYPE | ACTION IF RULE IS UN-OBSERVED | USER INTER-FACE (UI) CORRESPOND-ING TO DATA TYPE | RESTRIC-TION | INPUT RULE | ETC. |
|---|---|---|---|---|---|---|---|
| HYPER LINK OR IMAGE | URL | START FROM HTTP, HTTPS OR START FROM SLASH. RELATIVE URL REFER TO ROOT SITE. | | EditBox | NO BROWS-ING | NON | |
| AGGRE-GATED VALUE | REFER INPUT VALUE IN ANOTHER COLUMN | | | N/A | | | |
| BUSINESS DATA | BUSINESS APPLICATION DATA REGISTERED IN BUSINESS DATA CATALOG OF SPS | | | N/A | | | |

FIG.22

ToSps
Send to SharePoint
SELECT DELIVERY DESTINATION AND PUSH START KEY | TOP SCREEN | OK FULL NAME [Text]

CITY/ADDRESS (HOME) [Text]

COUNTRY/REGION [Text]

COMPANY NAME [Text]

IDENTIFICATION TYPE [Choice] | DRIVER'S LICENSE ▶

Edit | Back to FolderSelector | Back | Next

2201

RECORDING MEDIUM STORING SCREEN CONTROLLING PROGRAM, DELIVERY SYSTEM AND SCREEN CONTROLLING METHOD

BACKGROUND OF THE INVENTION

1. Field of the Invention

The present invention generally relates to a recording medium storing a screen controlling program, a delivery system and a screen controlling method.

2. Description of the Related Art

In recent years, image input and output apparatuses such as multifunction peripherals have been installed in or connected to networks in many business organizations. The image input and output apparatuses play a great role in measures of making business more efficient. Especially, an image delivery system of making computerization and distribution of paper documents more efficient becomes increasingly important. A major element forming the image delivery system is an information processing apparatus used as an image input apparatus such as a scanner and an image processing server such as a delivery server. Plural workflows are registered in conformity with various tasks and uses. One or plural operation flows are defined in the plural workflows. A user can carry out a scan by selecting a suitable workflow for the work from an operations panel of a scanner.

In order to enhance convenience in the image delivery system, there is a technique in which the bibliographic information is set in the delivered image data. For example, Patent Document 1 discloses a technique by which input bibliographic information is associated with flow definition data defining a workflow, and the workflow is carried out based on the flow definition data to which the bibliographic information is associated.

Meanwhile, a technique of reducing a cumbersome process for the user is being developed. For example, Patent Document 2 discloses a technique of easily changing an operations screen which is displayed on a multifunction peripheral in correspondence with the workflow.

In an input screen for inputting the above described bibliographic information, the user can input or select the bibliographic information in items set up by an administrator and included in a selected workflow. For example, if bibliographic information pieces of image data which can be stored are set up in a folder of a document controlling server in a delivery destination, there is a case where the bibliographic information input by the user is set up in the bibliographic information of the document controlling server. At this time, the administrator associates the previous bibliographic information of the document controlling server with the bibliographic information set up by the user one-by-one.

FIG. 1 illustrates a screen example 1 of the management tool for administrating the bibliographic information. Referring to FIG. 1, Web server using a Microsoft Office SharePoint Server (MOSS) of Windows ("Windows" is a registered trademark) is the document controlling server. The "column of MOSS" 101 illustrated in FIG. 1 includes bibliographic information of the document controlling server. The "setup value" illustrated in FIG. 1 includes a setup value (bibliographic information) associated with the bibliographic information of the document controlling server. The "column of MOSS" is associated with "setup value" existing in the same row as that of the "column of MOSS".

FIG. 2 illustrates a screen example 2 of the management tool for managing the bibliographic information. The screen illustrated in FIG. 2 is displayed by pressing the "add button" 103 illustrated in FIG. 1. An example illustrated in FIG. 2 associates a column 201 for selecting bibliographic information set in the "MOSS" with bibliographic information set by the user one-by-one. There are a selection mode and an input mode in the bibliographic information set by the user. In a case of the selection mode, options are displayed inside a column 202. The column 202 is input in a column 203 by an administrator in a case of the input mode. It is determined by a user whether the selection mode or the input mode is used by a radio button 204.

As described, the administrator associates the bibliographic information of the document controlling server with the bibliographic information set up by the user one-by-one as illustrated in FIG. 1 and FIG. 2. Therefore, a burden of the administrator is large. As described in Patent Document 2, the user may change or select items of the bibliographic information in the setup screen.

Patent Document 1: Japanese Laid-Open Patent Application No. 2008-97586
Patent Document 2: Japanese Laid-Open Patent Application No. 2009-260906

SUMMARY OF THE INVENTION

Accordingly, embodiments of the present invention provide a novel and useful recording medium storing a screen controlling program, a delivery system and a screen controlling method solving one or more of the problems discussed above.

One aspect of the embodiments of the present invention may be to provide a screen controlling program representing a sequence of instructions, the screen controlling program which when executed by a computer included in an information processing apparatus connected to an image forming apparatus and a document controlling server, the instructions including outputting an acquisition request of a contents type, included in one or plural bibliographic information pieces which are defined in a storage destination of image data indicated by a storage information piece, to the document controlling server if the storage information is received from the image forming apparatus; generating, if the one or plural contents types defined in the storage destination are received from the document controlling server, selection screen data for selecting the received one or plural contents types; sending the generated selection screen data to the image forming apparatus; generating setup screen data for setting one or plural bibliographic information pieces included in the selected contents type if the selected contents type is received from the image forming apparatus; and sending the generated setup screen data to the image forming apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 9 illustrates an example setup screen (first screen) for a management tool.

FIG. 10 illustrates an example setup screen (basic setup for a basic path) for the management tool.

FIG. 15 is an example field list of an identification paper.

FIG. 19A, FIG. 19B and FIG. 19C illustrate an example relationship among data types and associated information of the data types.

FIG. 22 illustrates example setup data of Embodiment 2.

DETAILED DESCRIPTION OF THE PREFERRED EMBODIMENTS

A description is given below, with reference to the FIG. 1 through FIG. 23 of embodiments of the present invention.

Hereinafter, reference symbols typically designate as follows:
301,303: MFP;
305: delivery server (information processing apparatus);
307: document controlling server;
309: information processing terminal;
501: control unit;
503: main memory unit;
505: auxiliary memory unit;
509: network I/F unit;
601: image reading portion;
603: display controlling portion;
605: communicating portion;
701: workflow setting portion;
703, 2101: communicating portion;
705: bibliographic information requesting portion;
707, 2103: screen data generating portion;
709: job executing portion;
711: workflow controlling portion;
713: workflow processing portion;
715: storing portion; and
2105: authority determining portion.

In the Embodiment described below, an image input apparatus for inputting image data is a multifunction peripheral in which a scanner function, a copy function and a facsimile function are installed in one casing as an image input apparatus inputting the image data. However, the present invention is not limited thereto. The Embodiment of the present invention is applicable to any of a scanner, a facsimile machine, a copier or the like as long as image data can be input in the image input apparatus.

Embodiment 1
<Image Processing Apparatus and Hardware>

Figure 1:
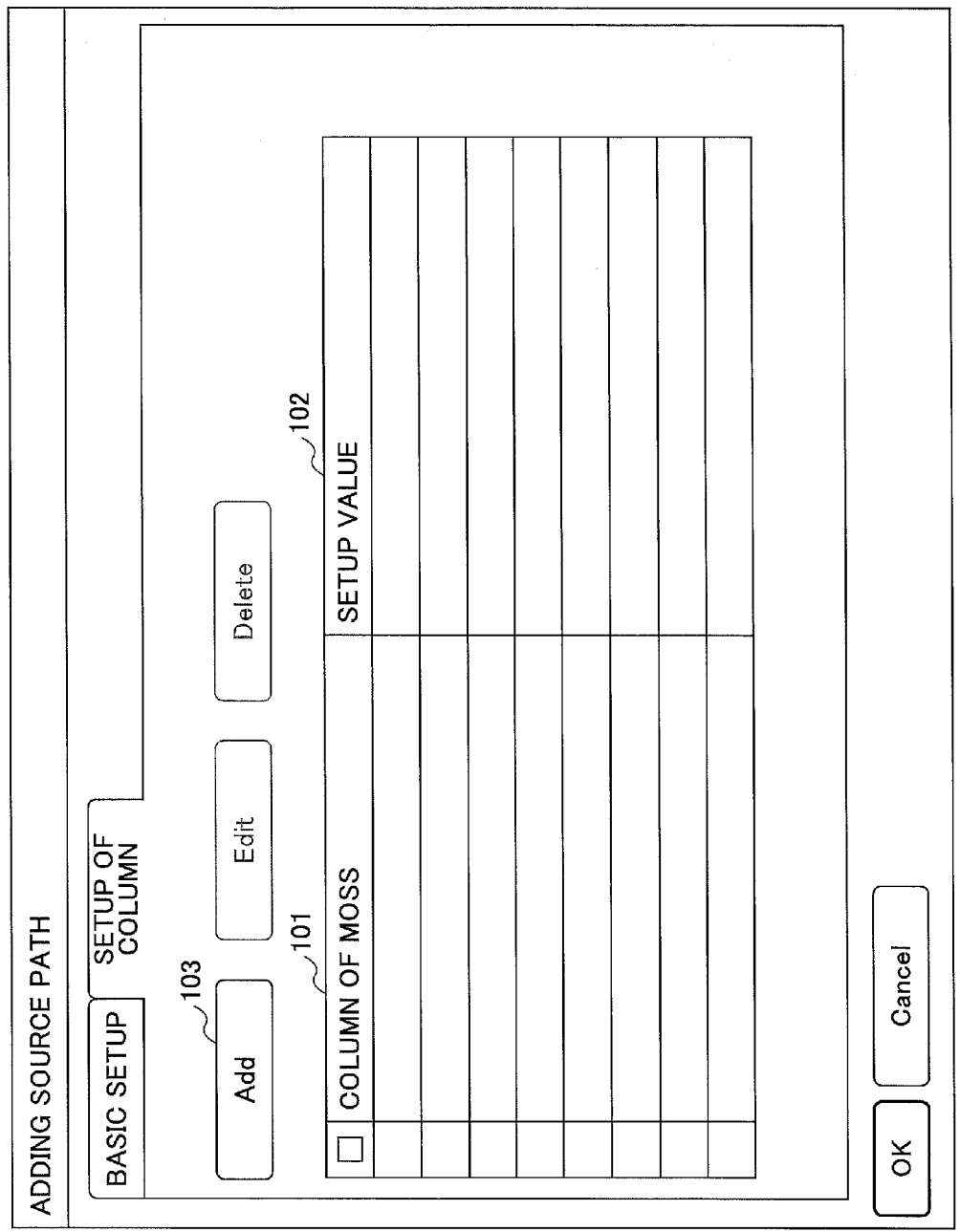
FIG. 1 illustrates a screen example 1 of a management tool for managing bibliographic information.
Figure 2:
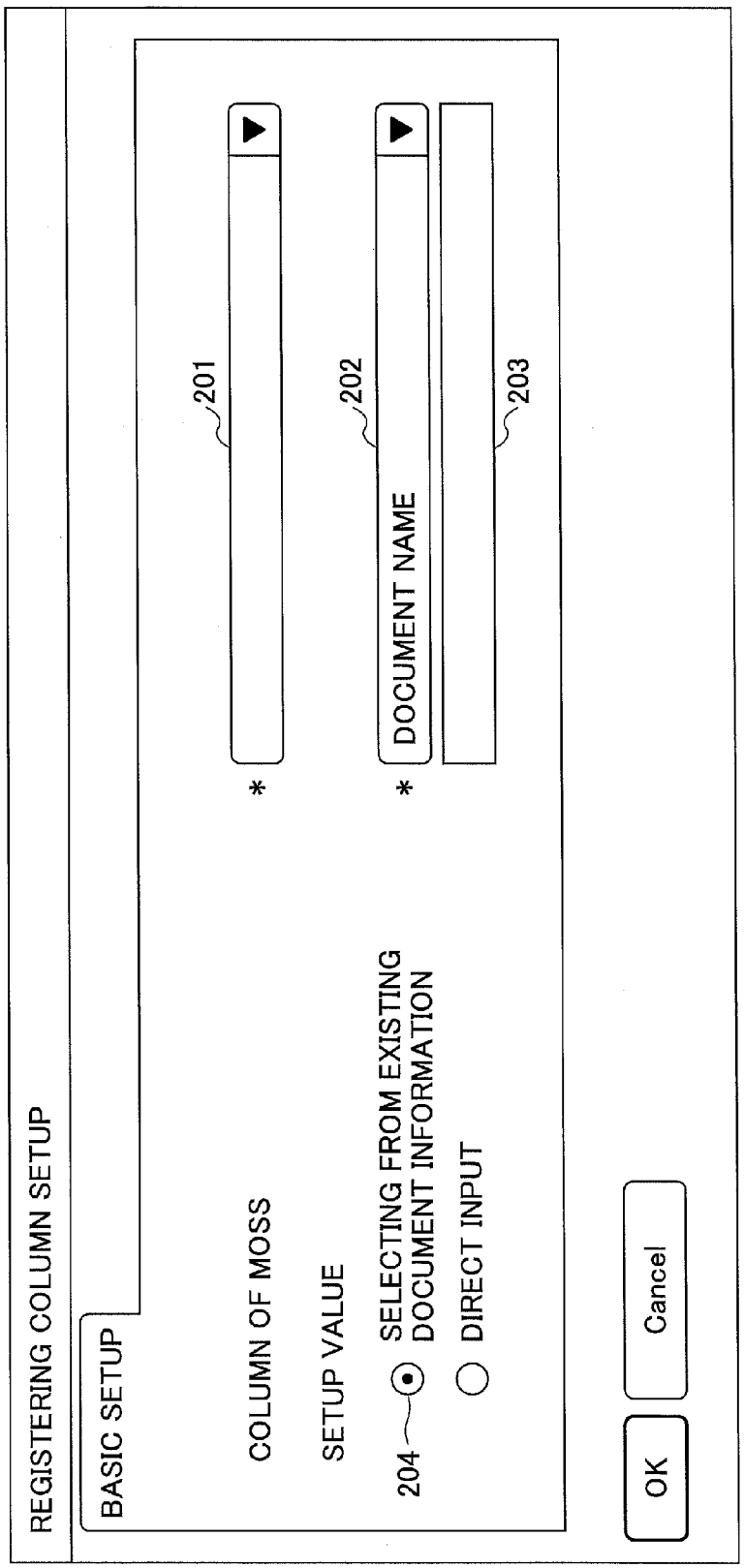
FIG. 2 illustrates a screen example 2 of a management tool for managing the bibliographic information.
Figure 3:
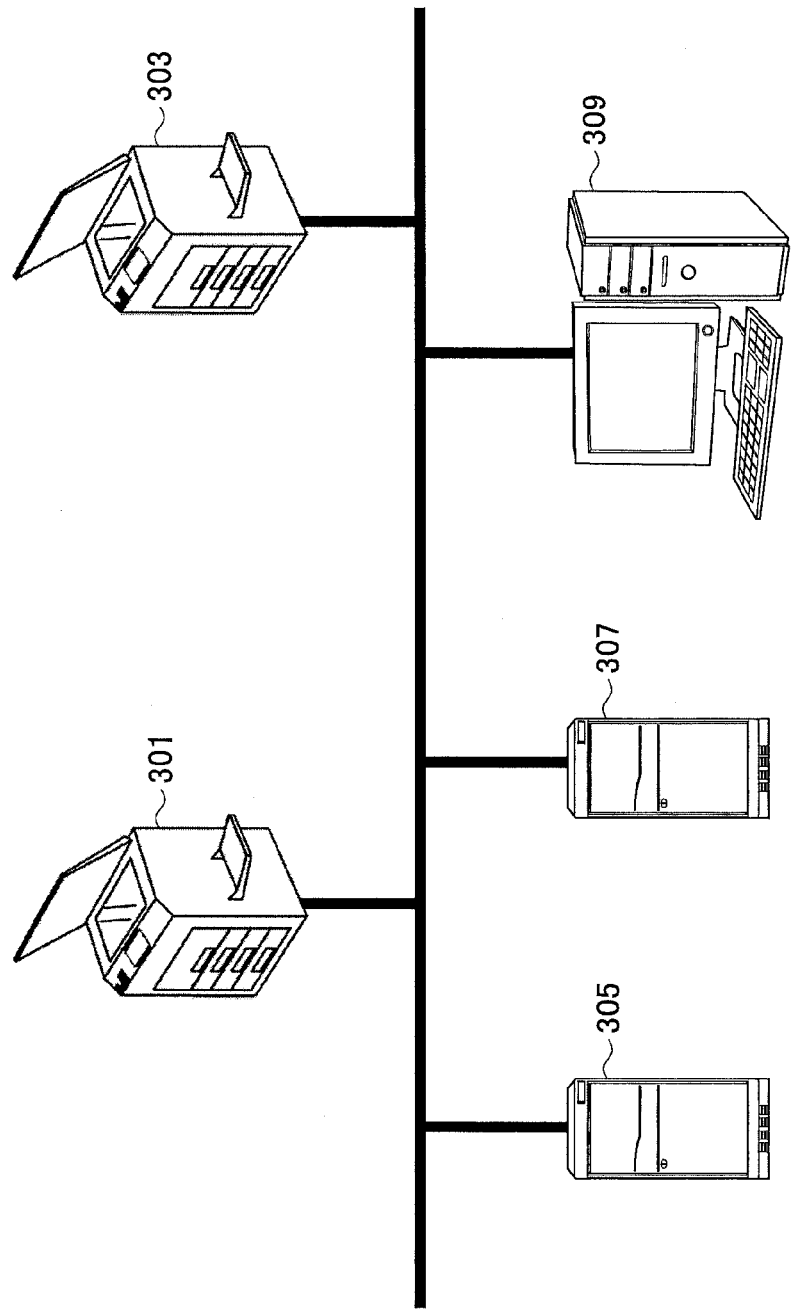
FIG. 3 illustrates an example image delivery system of Embodiment 1.

FIG. 3 illustrates an example image processing system of Embodiment 1. As illustrated in FIG. 3, the image processing system includes a Multifunction Peripheral (MFP) 301, a MFP 303, a delivery server (an information processing apparatus) 305, a document controlling server (an information processing apparatus) 307, and an information processing terminal 309 such as a Personal Computer (PC) and a Personal Data Assistance (PDA), which are connected via a network.

The MFP 301 and the MFP 303 respectively have a scanner function, a copy function, a printer function, and a facsimile function in one casing. The MFP 301 and the MFP 303 generate image data by scanning a paper medium or the like by the scanner function, and the generated image data are transmitted to the delivery server 305. A detailed description of the MFP is described later. The image data contain image data of documents.

The delivery server 305 is a computer such as a workstation which receives image data scanned by each of the MFPs and carries out various processes including a delivery process in conformity with designated workflows. The workflows include mail transmission, facsimile transmission, folder delivery, and so on.

The delivery server 305 carries out a workflow based on input image data and accumulation or delivery of documents in conformity with a workflow determined by a user. A detailed description of the delivery server 305 is given below. The delivery server 305 may be assembled in the MFP 301 or the MFP 303.

The document controlling server 307 accumulates and manages the image data delivered from the delivery server 305. Further, the document controlling server 307 can register bibliographic information in accumulated image data and searches for the accumulated image data. The document controlling server 307 may be a Web server. The document controlling server may be a Share Point (SP) server of Windows ("Windows" is a registered trademark).

The information processing terminal 309 starts up a management tool related to data delivery with an administrator and produces a workflow by sequentially selecting plug-ins of image conversion and output. The produced workflow is stored in the delivery server 305.

The information processing terminal 309 activates a management tool for managing the bibliographic information used in the document controlling server 307 and the delivery server 305. Then, the administrator sets up data related to the bibliographic information.

The number of the MFPs and the information processing apparatuses which are connected via the network may be an arbitrary number. The delivery system may have a mail delivery server or the like. If the delivery server 305 is assembled into the MFP, it is possible to produce the workflow in the MFP.

Figure 4:
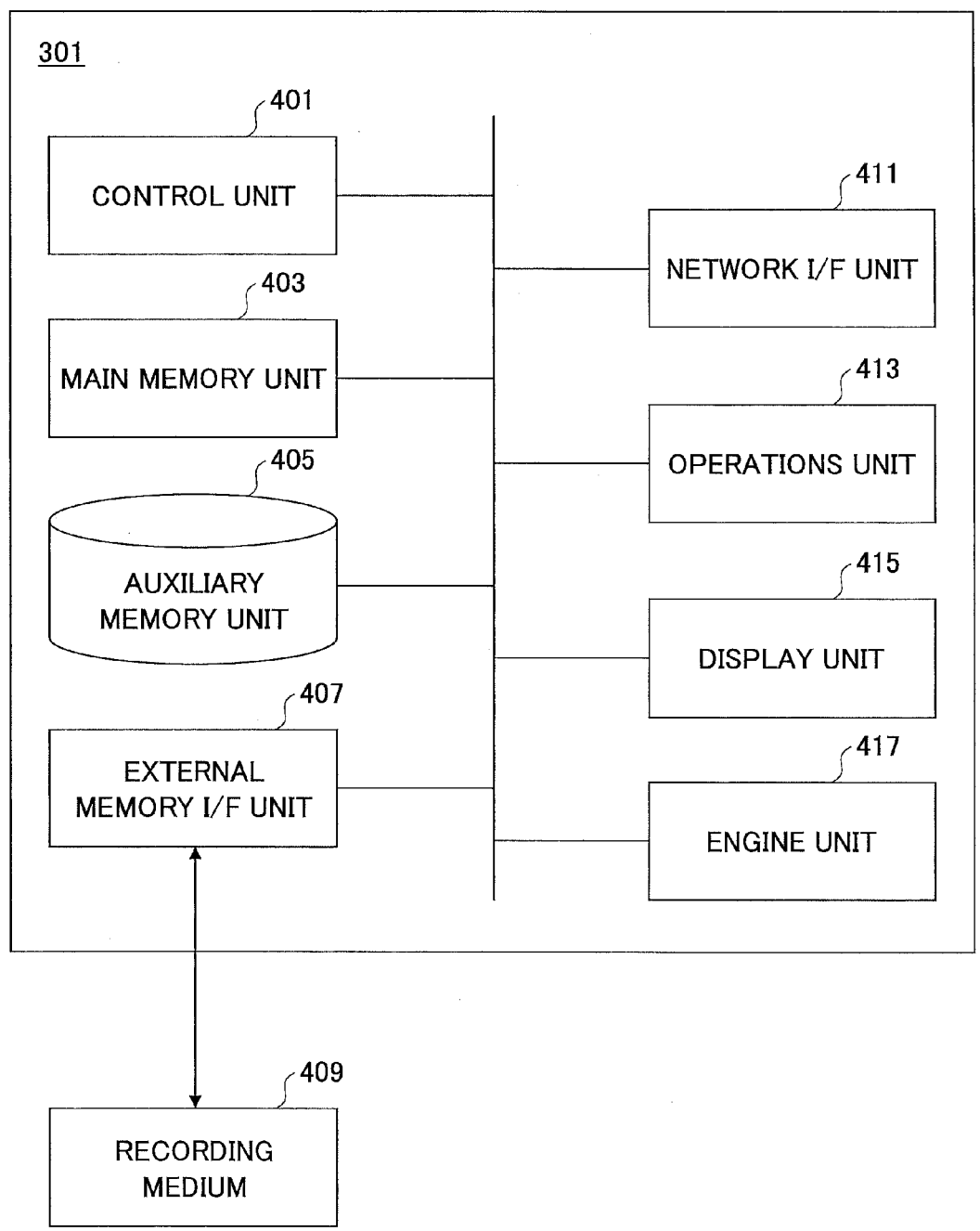
FIG. 4 illustrates example hardware of a MFP of Embodiment 1.

Next, hardware of the MFP and hardware of the delivery server 305 of Embodiment 1 are described. FIG. 4 illustrates example hardware of the MFP of Embodiment 1. As illustrated in FIG. 4, the MFP 301 includes a control unit 401, a main memory unit 403, an auxiliary memory unit 405, an external memory device I/F unit 407, a network I/F unit 411, an operations unit 413, a display unit 415, and an engine unit 417. These components are mutually connected so as to be able to send and receive data via a bus.

The control unit 401 is a CPU carrying out controls of various units and portions, and operation and processing of data in the computer. The control unit 401 is an arithmetic device which executes programs stored in the main memory unit 403, receives data from an input device or a memory device, provides arithmetic computation and processing, and outputs to an output device or a memory device.

The main memory unit 403 may be a Read Only Memory (ROM) or a Random Access Memory (RAM), and constantly or temporarily stores programs and data, processed by the control unit 401, such as an Operating System (OS) being basic software or application software.

The auxiliary memory unit 405 may be a HDD and stores data related to the application software or the like.

The external memory device I/F unit 407 is an interface between a recording medium 409 such as a flash memory and the MFP 301 connected via a data communication line such as a universal serial bus (USB).

The storage medium 409 stores a predetermined program, and the program stored in the recording medium 409 is installed in the MFP 301 via the external memory I/F unit 407. The installed program becomes executable with the MFP 301.

The network I/F unit 411 is an interface between the MFP 301 and peripheral apparatuses which have a communication function and is connected to a network such as a Local Area Network (LAN) and a Wide Area Network (WAN) formed with wired or wireless data transmission paths.

The operations unit 413 and the display unit 415 may be made of a key switch (hardware keys) and a Liquid Crystal Display (LCD) having a touch panel including software keys of a Graphical User Interface (GUI). The operations unit 413 and the display unit 415 are User Interfaces (UI) utilizing the functions of the MFP 301.

An engine unit 417 reads a paper original document (a paper manuscript) and prints on a transfer paper as an input and output unit of the image data. The MFP 301 may further provide hardware such as a scanner.

Figure 5:
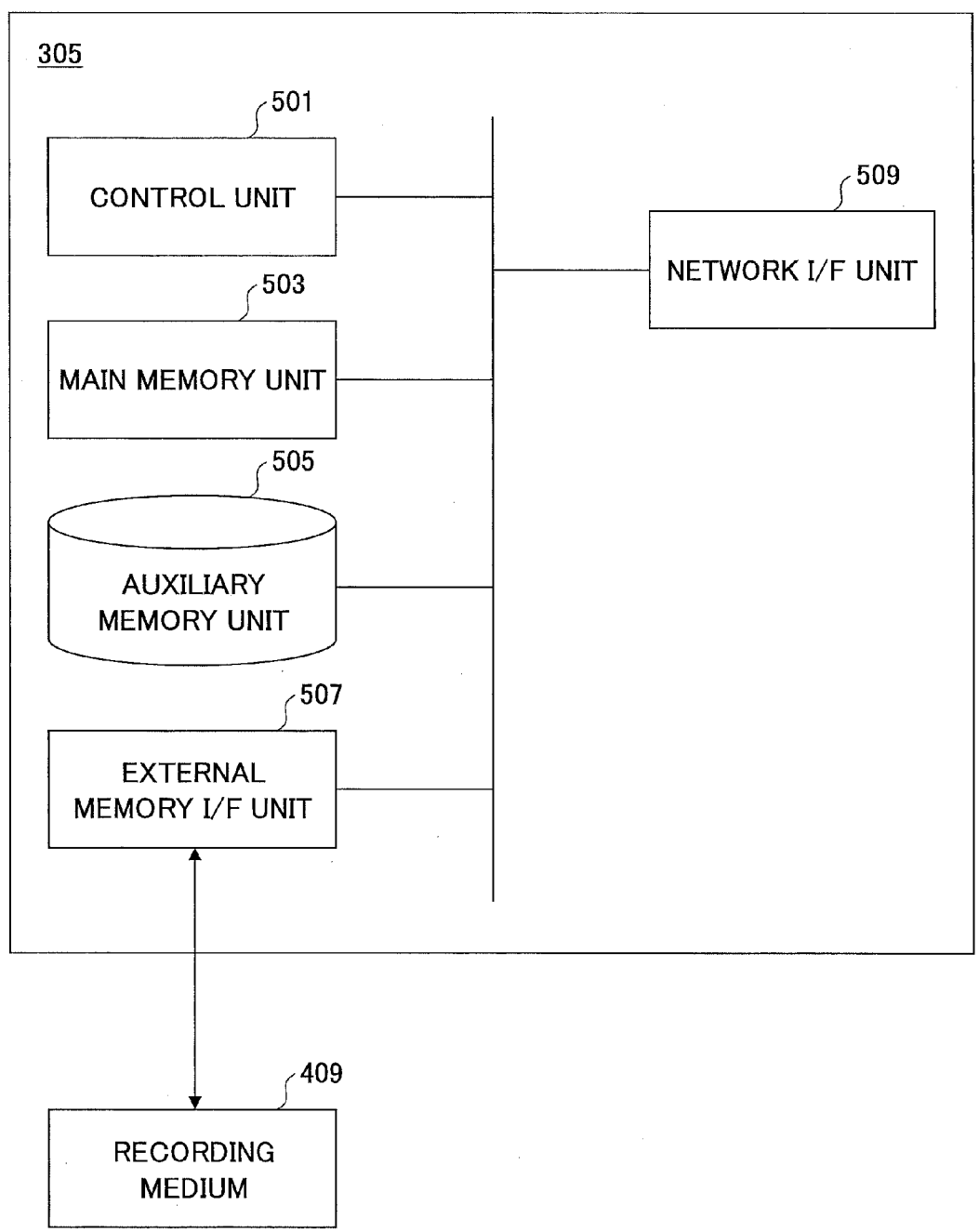
FIG. 5 is a block chart of example hardware of a delivery server of Embodiment 1.

FIG. 5 is a hardware block chart of a delivery server 305 of Embodiment 1. As illustrated in FIG. 5, the delivery server 305 includes a control unit 501, a main memory unit 503, an auxiliary memory unit 505, an external memory device I/F unit 507, and a network I/F unit 509. These components are mutually connected so as to be able to send or receive data via a bus.

The control unit 501 is a CPU carrying out controls of various units and portions, and operation and processing of data in the computer. The control unit 501 is an arithmetic device which carries out programs stored in the main memory unit 503, receives data from an input device or a memory device, provides arithmetic computation and processing, and outputs to an output device or a memory device.

The main memory unit 503 may be a Read Only Memory (ROM) or a Random Access Memory (RAM), and constantly or temporarily stores programs and data, processed by the control unit 501, such as an Operating System (OS) being basic software or application software.

The auxiliary memory unit 505 may be a Hard Disk Drive (HDD) and stores data related to the application software or the like.

The external memory device I/F unit 507 is an interface between a recording medium 409 such as a flash memory and the delivery server 305, which are connected via a data communication line such as a universal serial bus (USB).

The storage medium 409 stores a predetermined program, and the program stored in the recording medium 409 is installed in the delivery server 305 via the external memory I/F unit 507. The installed program becomes executable with the delivery server 305.

The network I/F unit 509 is an interface between the delivery server 305 and peripheral apparatuses which have a communication function and is connected to a network such as a Local Area Network (LAN) and a Wide Area Network (WAN) formed with wired or wireless data transmission paths.

The delivery server 305 may include an input unit and a display unit. The input unit 15 includes a keyboard having a cursor key, a numeric keypad, a keyboard having the numeric keypad, keys, various function keys or the like, a mouse for enabling a user to select the keys on a display screen of a display unit (not illustrated), a slice pad or the like. The input unit is a user interface through which the user can provide an operational instruction to the control unit 501 and input data.

The display unit (not illustrated) may be a CRT, a LCD or the like displaying in response to display data input from the control unit 501.

<Function>

Figure 6:
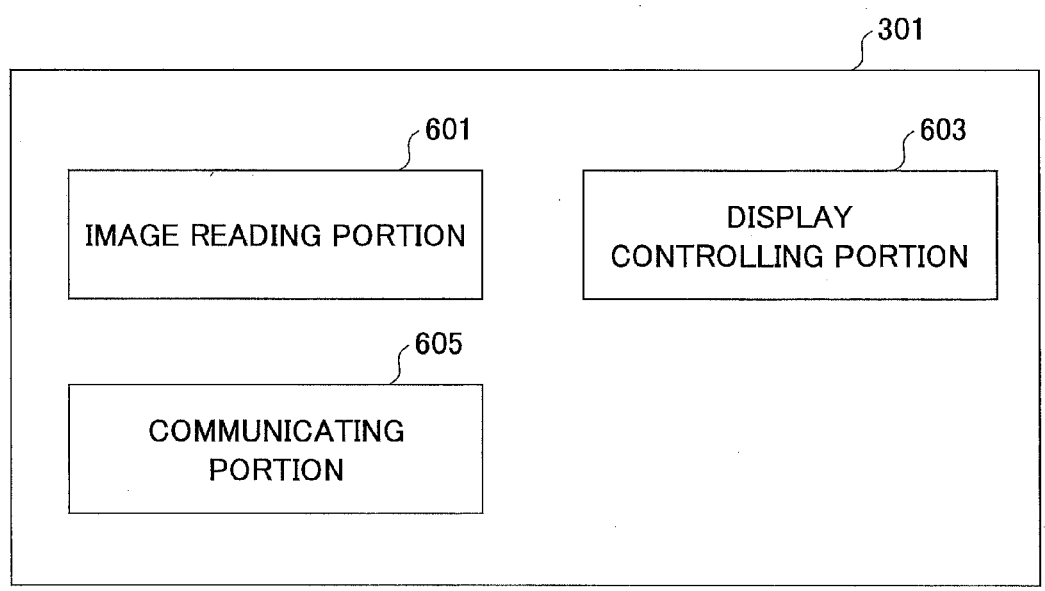
FIG. 6 illustrates an example block chart of the MFP of Embodiment 1.

FIG. 6 illustrates an example block chart of the MFP 301 of Embodiment 1. Referring to FIG. 6, the MFP 301 includes an image reading portion 601, a display controlling portion 603, and a communicating portion 605. Functions ordinarily provided in MPFs such as a printer function, a copy function and a facsimile function are not illustrated.

The image reading portion 601 acquires the image data by reading a manuscript with a scanner function. The image data are acquired via facsimile, from the information processing terminal 309, or from a hot folder on a network.

The display controlling portion 603 displays image data acquired from the delivery server 305 via the communicating portion 605 on an operations panel (the operations unit 413 and the display unit 415). The display controlling portion 603 acquires data selected by a user and input data on the operations panel and outputs the data to the communicating portion 605. The data selected and input by the user include bibliographic information, storage information indicative of a delivery destination of the image data and a content type indicative of the type of the image data. The bibliographic information may be an item of property set up in a file of the image data.

The communicating portion 605 sends the storage information selected by the operations panel, the set-up bibliographic information, the image data scanned by the scanner function or the like to the delivery server 305. The communicating portion 605 receives predetermined image data from the delivery server 305. If a request for a workflow of the image data is made by a user, the communicating portion 605 sends the image data and the request for the workflow to the delivery server 305.

The image reading portion 601 can be realized by a scanner. The receiving portion 603 is realized by control of the operations unit 413 and the display unit 415 with the control unit 401, and the communicating portion 605 is realized by control of the network I/F unit 411 with the control unit 401.

Figure 7:
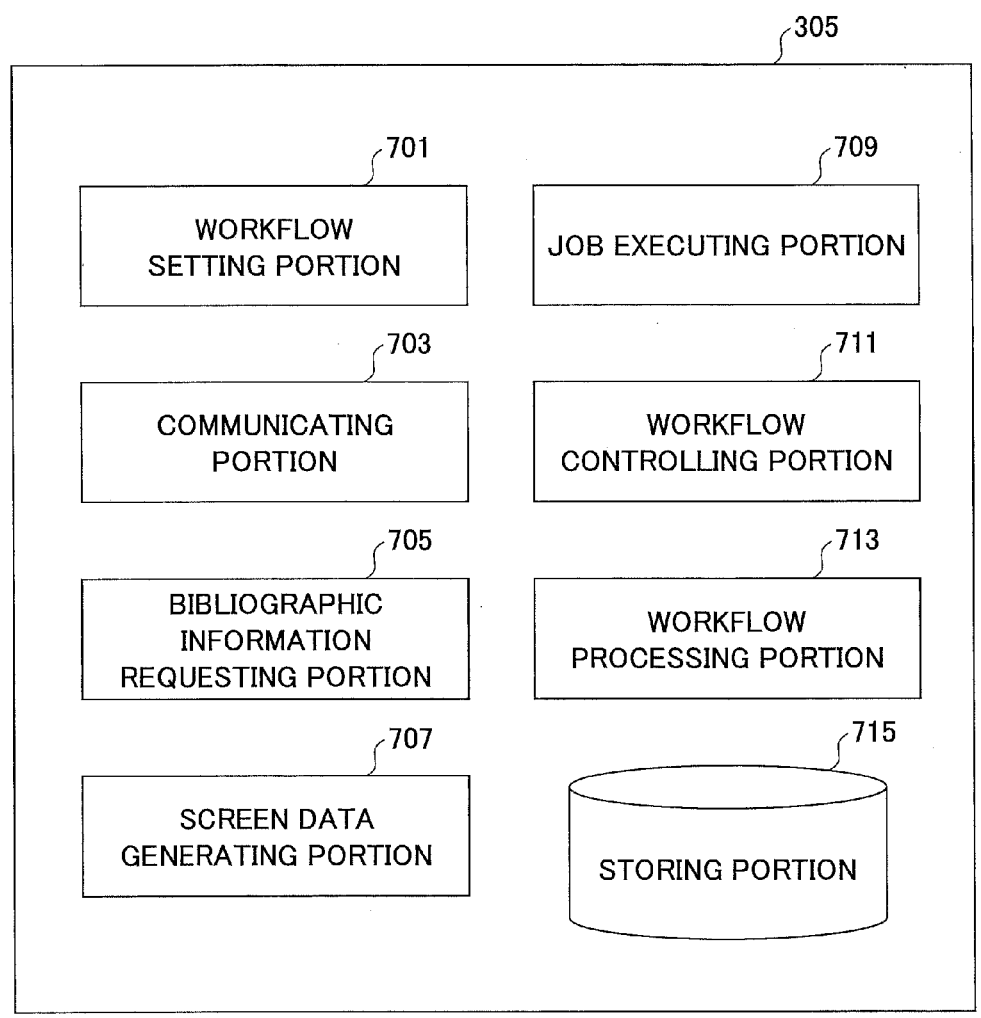
FIG. 7 illustrates an example block chart of a delivery server function of Embodiment 1.

Next, the function of the delivery server 305 is described. FIG. 7 is a block chart illustrating an example function of a delivery server of Embodiment 1. The delivery server 305 includes a workflow setting portion 701, a communicating portion 703, a bibliographic information requesting portion 705, a screen data generating portion 707, a job executing portion 709, a workflow controlling portion 711, a workflow processing portion 713 and a storing portion 715.

If the user sets up a workflow formed by arbitrarily assembling plug-ins of the image converting process or the output process, the workflow setting portion 701 stores the set workflow of, for example, a XML form in the storing portion 715. The workflow setting portion 701 controls a UI screen or the like for setting the workflow to be displayed on the information processing terminal 309.

Figure 8:
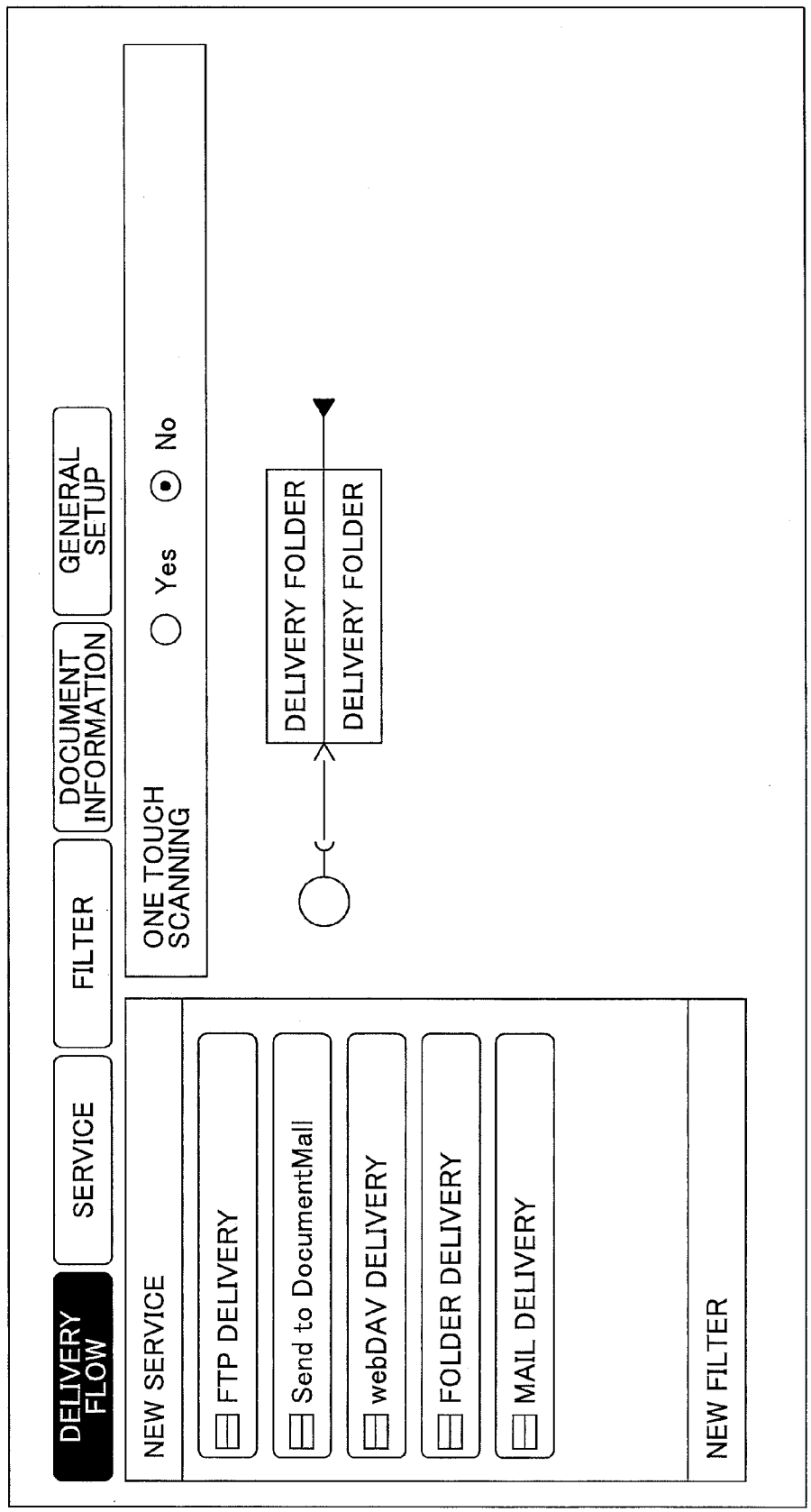
FIG. 8 illustrates a workflow setup for delivering folders.

FIG. 8 illustrates a workflow setup for delivering folders. With the workflow illustrated in FIG. 8, the scanned image data are delivered to a predetermined folder of the server. The screen illustrated in FIG. 8 is displayed in a display unit of the information processing terminal 309. The users can arbitrarily assemble the plug-ins to construct the workflow. The constructed workflow is transmitted to the delivery server 305 from the information processing terminal 309 and stored in the storing portion 715 described later.

Referring back to FIG. 7, the communicating portion 703 receives storage information indicating storage destination of a delivery destination for the image data, the bibliographic information, and the image data from the MFP 301. The communicating portion 703 sends an acquisition request of the contents type including the bibliographic information for the document controlling server 307. The communicating portion 703 receives the bibliographic information (including options of the bibliographic information) requested by the document controlling server 307. The communicating portion 703 gives the bibliographic information set by the user to the image data and sends the image data having the bibliographic information to the document controlling server 307.

If a request for processing the workflow (e.g. a job request) is received from the MFP 301, the communicating portion 703 outputs the identification information of the workflow, the image data, or the like to the job executing portion 709.

If the storage information is received by the communicating portion 703, the bibliographic information requesting portion 705 instructs the storage destination indicated by the storage information to request acquisition of the content type including the bibliographic information. The storage destination may be a folder inside the document controlling server 307. The storage information includes a path (e.g. a URL) to the folder inside the document controlling server 307.

The screen data generating portion 707 generates screen data related to the bibliographic information depending on the situation, and sends the generated screen data to the MFP 303 or the information processing terminal 309 via the communicating portion 703. For example, a screen data generating portion 707 generates selection screen data for selecting the content type if plural content types including one or plural bibliographic information pieces are acquired from the document controlling server 307. The screen data generating portion 707 may store a template of the selection screen data and generate a user interface (UI) for displaying the acquired content type as options to the template.

If the screen data generating portion 707 acquires the selected content type from the MFP 301 via the communicating portion 703, the setup screen data for setting the bibliographic information are contained in the selected content type. The setup screen data include the user interface (UI) such as EditBox, ComboBox, and RadioButton used for inputting the bibliographic information. It is defined in the bibliographic information which user interface (UI) is to be used. The screen data generating portion 707 may hold a template of the setup screen data and generate the user interface (UI) to be set to the acquired bibliographic information to the template.

The screen data generating portion 707 outputs the generated selection screen data and the setup screen data to the communicating portion 703.

The job executing portion 709 carries out the job requested by the MFP 301. The job executing portion 709 sends the request for processing the workflow to the workflow controlling portion 711, and outputs the identification information of the workflows, the bibliographic information of processing the workflows or the image data to the workflow controlling portion 711.

If the workflow controlling portion 711 receives the request for processing the workflows from the job executing portion 709, the workflow controlling portion 711 controls executions of various processes which are included in the workflows. Further, if the workflow processing portion 713 receives an instruction of controlling the workflows from the workflow controlling portion 711, the workflow processing portion 713 carries out the workflows in conformity with the instruction and carries out the delivery. Differently, the workflow processing portion 713 sequentially carries out the processes included in the workflows and delivers the image data to the destinations of delivery.

The processes carried out by the workflow processing portion 713 can be divided into an image converting process, an output process (delivery process) or the like. The image converting process is a process of converting an image data type, an image dividing process or the like. The image converting process may be a PDF conversion, a TIFF conversion or the like. The output process is a process of delivering the acquired image data or image data subjected to the image conversion to a delivery destination such as a mail delivery server and the document controlling server 307. The workflow processing portion 713 carries out at least the output process.

The storing portion 715 stores plug-ins of the image converting process and the output process, or one or more workflows formed by assembling the plug-ins.

The workflow setting portion 701, the bibliographic information requesting portion 705, the screen data generating portion 707, the job executing portion 709, the workflow controlling portion. 711, and the workflow processing portion 713 may be realized by the control unit 501 or the main memory unit 503 as a work memory. The storing unit 715 may be realized by the auxiliary memory unit 505. The communicating portion 703 maybe realized by controlling the network I/F unit 509 with the control unit 501.

<Screen Example>

Next, a screen example related to the bibliographic information is described. FIG. 9 illustrates an example setup screen (first screen) for the management tool. Referring to FIG. 9, a Share Point (SP) server of Windows ("Windows" is a registered trademark) is designated as the delivery destination. The screen data illustrated in FIG. 9 is sent by the delivery server 305 to the information processing terminal 309 if the delivery server 305 receives an acquisition request from the information processing terminal 309. The screen data are displayed on the display unit of the information processing terminal 309. The field 900 illustrated in FIG. 9 is a field in which a server name of the delivery destination is set.

"DisplayName" 901 illustrated in FIG. 9 designates a display name of a library. "URL" 902 may indicate a position of the server of the delivery destination on the network. "Library" 903 may indicate a library name.

The administrator sets up a candidate of the delivery destination of the workflow using the screen illustrated in FIG. 9. If the "Add" button 904 illustrated in FIG. 9 is pressed, it is possible to add the delivery destination.

FIG. 10 illustrates an example setup screen (basic setup for a basic path) for the management tool. The screen illustrated in FIG. 10 is displayed by pressing the "Add" button 904 illustrated in FIG. 9.

A field 1001 illustrated in FIG. 10 is a field in which a server name of the delivery destination to be added is set. A field 1002 illustrated in FIG. 10 is a field in which the position of the server to be added is set. A field 1003 is a field in which a measure of authentication is selected. A field 1004 is a field for setting a login name of a user to be authenticated. A field 1005 is a field for setting a password of the user to be authenticated. If the "Connect" button 1006 is pressed, the example setup screen is connected to the server set in the field 1002 and acquires predetermined information.

The administrator can register a server to which the workflow is newly delivered on the screen illustrated in FIG. 10. As illustrated in FIG. 9 and FIG. 10, the administrator can register only the server and the library and the sub-folder cannot be registered.

Figure 11:
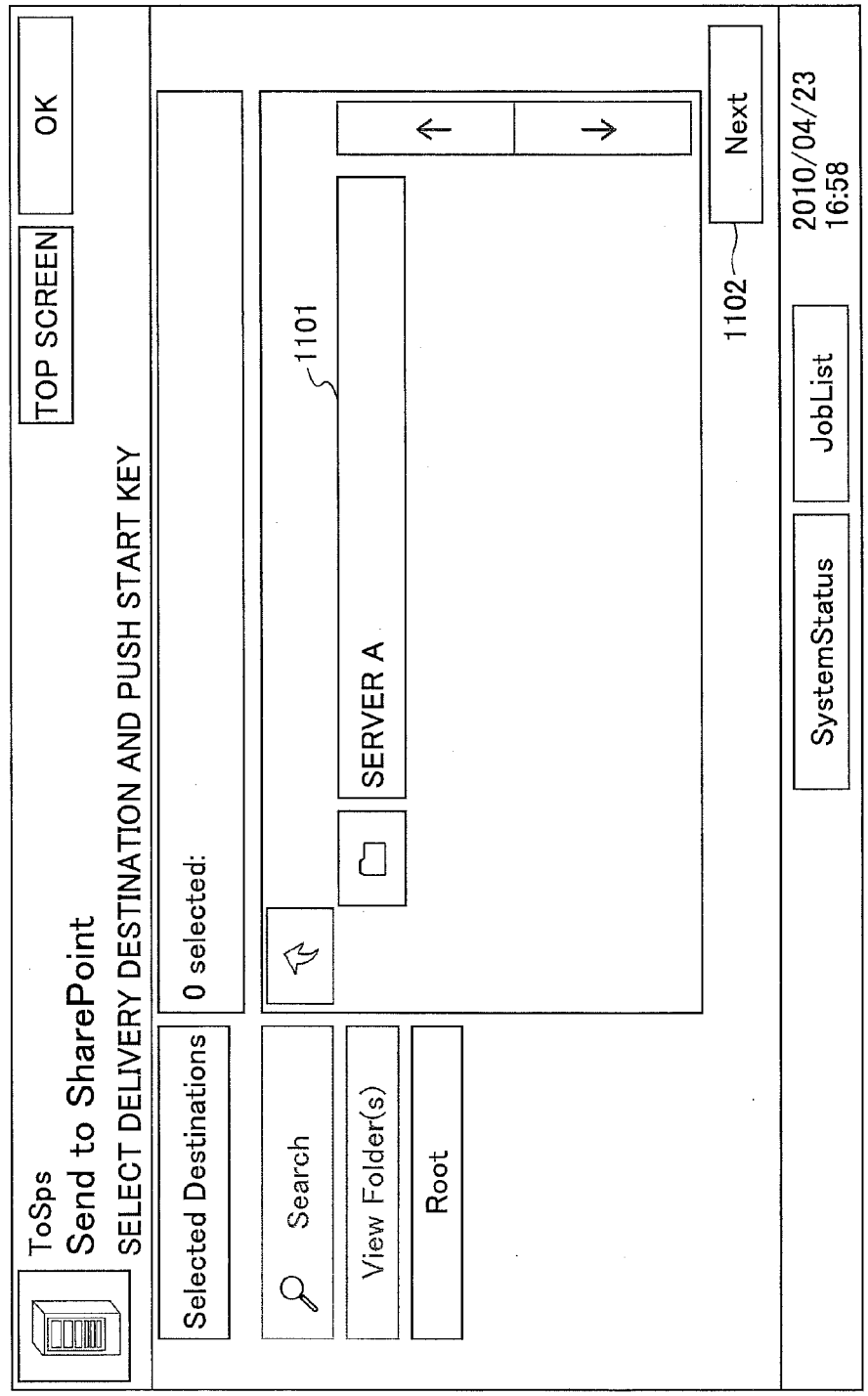
FIG. 11 illustrates a screen example for determining a delivery destination.

FIG. 11 illustrates a screen example for determining the delivery destination. The screen illustrated in FIG. 11 is displayed on the operations panel of the MFP 301. In the example illustrated in FIG. 11, the user may select "Send to SharePoint" as a workflow. On the screen illustrated in FIG. 11, a document controlling server as a candidate of the registered delivery destination is displayed. In the example illustrated in FIG. 11, "Server A" 1101 is displayed. Referring to FIG. 11, only "Server A" is displayed. However, plural servers maybe displayed.

A next button is provided to display a library inside the selected server. After the server (the server A1101) to which the workflow is to be delivered is selected, a "Next" button 1102 is pressed.

Figure 12:
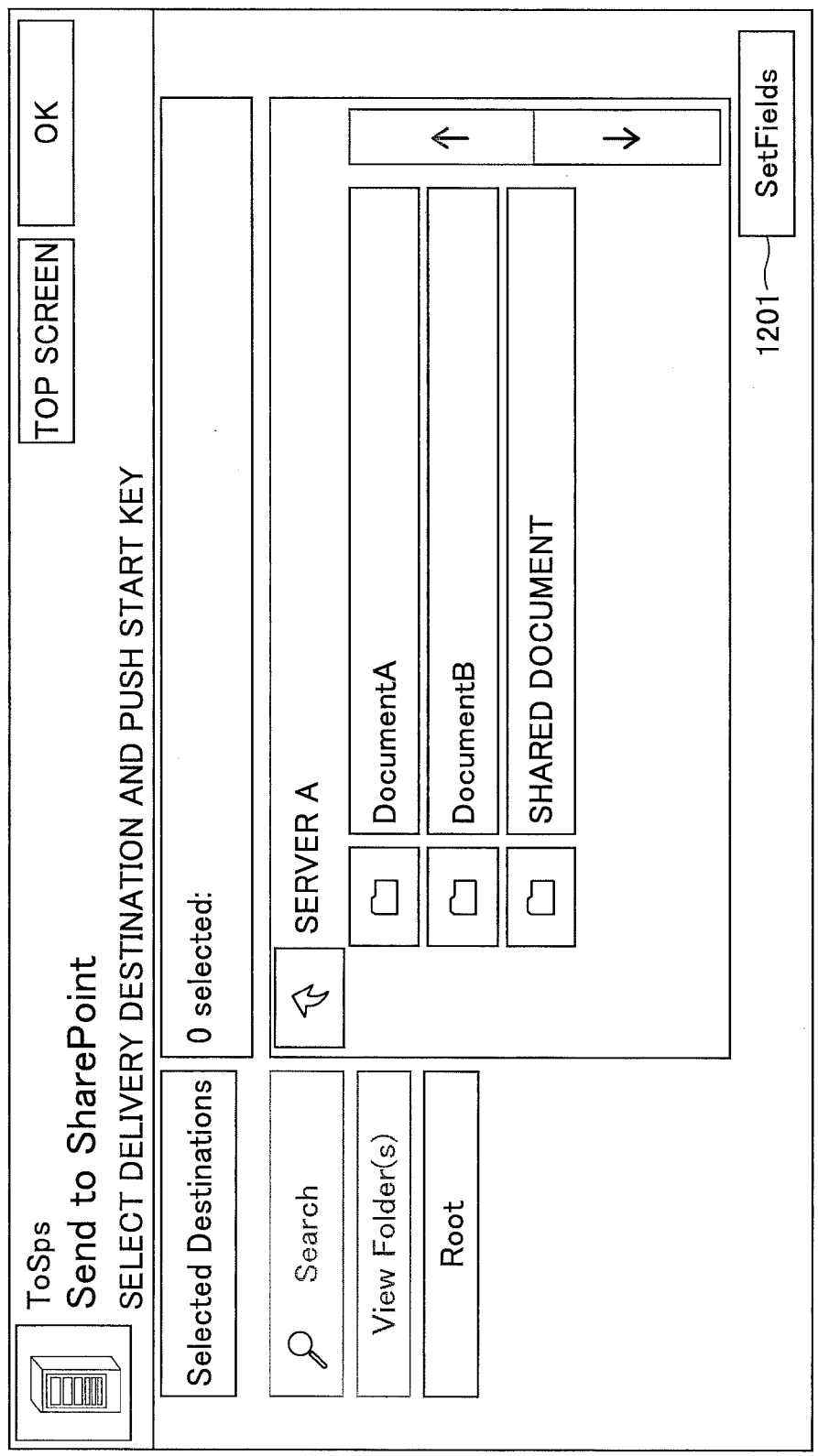
FIG. 12 illustrates a screen example for selecting a library of a server A.

FIG. 12 illustrates a screen example for selecting a library of the server A. In the example illustrated in FIG. 12, the library such as "Document A", "Document B" and "Common Document" is included in the server A. After the document to be delivered is selected, a "SetFields" button 1201 is pressed. A description is given below in a case where "Document A" is selected in the example illustrated in FIG. 12.

Figure 13:
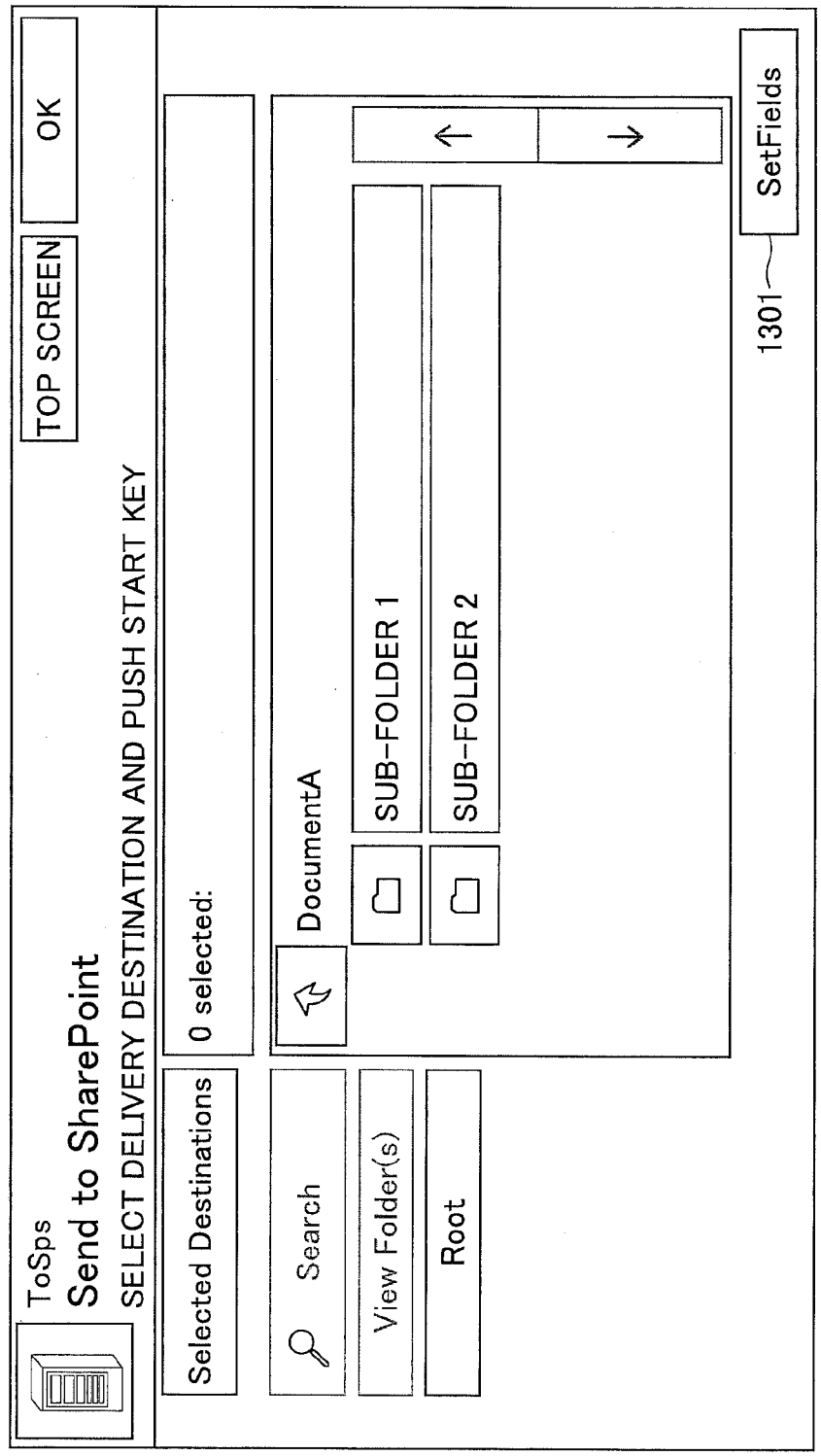
FIG. 13 illustrates a screen example for selecting a subfolder.

FIG. 13 illustrates a screen example for selecting a sub-folder. In the example illustrated in FIG. 13, there are sub-folders "sub-folder 1" and "sub-folder 2" in the library "Document A". After the sub-folder to be delivered is selected by the user, a "SetFields" button 1301 is pressed.

Figure 14:
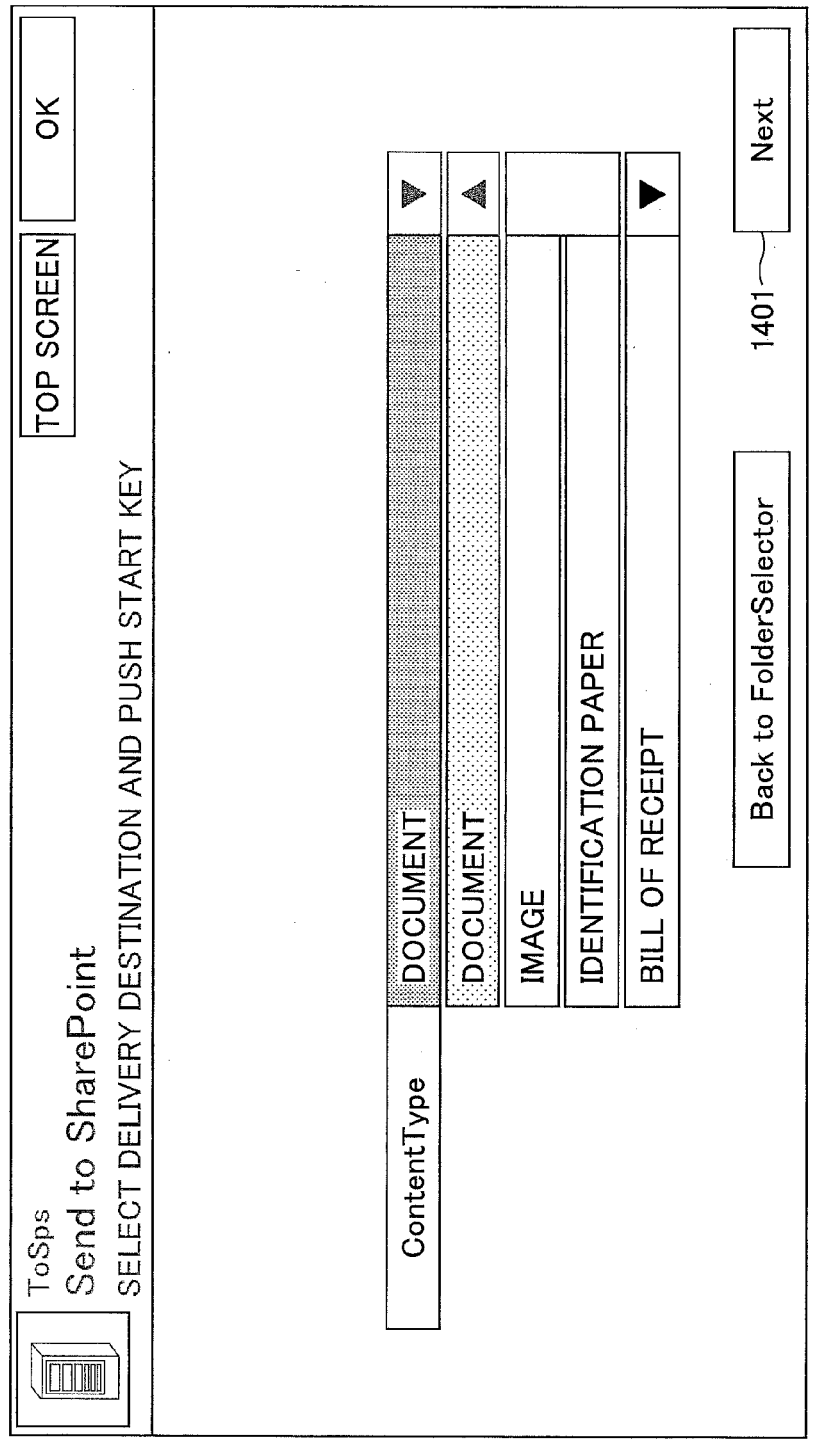
FIG. 14 illustrates a screen example for selecting a content type.

FIG. 14 illustrates a screen example for selecting a content type. In the example illustrated in FIG. 14, if the "SetFields" button 1301 illustrated in FIG. 13 is pressed, a list of the content types defined in the sub-folder is displayed. The content type is a type of a document stored in a folder. As an example, the content types such as "document", "image", "identification paper", and "bill of receipt" are defined in the sub-folder. After the content types of the stored documents are selected, a "Next" button 1401 may be pressed.

FIG. 15 is an example field list of an identification paper. A screen example illustrated in FIG. 15 is displayed if "identification paper" is selected from the contents list illustrated in FIG. 14 and the "Next" button 1401 is pressed.

Referring to FIG. 15, in the content type "identification paper", bibliographic information such as "full name", "city/address (home)", "country/region", "company name" and "identification paper type" are defined. In the field of the bibliographic information, an input mode such as "full name" and "city/address (home)" and a selection mode such as "identification paper type" are included. Data types of the fields may be previously set up by the administrator of the document controlling server 307. If the delivery server 305 acquires the data type set up by the administrator, the screen data as illustrated in FIG. 15 are generated. The user may set up the bibliographic information using the screen illustrated in FIG. 15 on the operation panel.

By scanning a document such as a driver's license after setting up the bibliographic information of the screen illustrated in FIG. 15, the setup bibliographic information is associated with the scanned image data and sent to the server 307. The document controlling server 307 stores the bibliographic information given to the delivered image data as various items of a property in association with the delivered image data.

Figure 16:
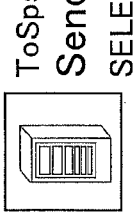
FIG. 16 is an example field list of a bill of receipt.

FIG. 16 is an example field list of a bill of receipt. The example field list of the bill of receipt illustrated in FIG. 16 is displayed if "bill of receipt" is selected from the contents list illustrated in FIG. 14 and the "Next" button 1401 is pressed.

Referring to FIG. 16, the bibliographic information of "buy date", "buyer", "charge", "title" and "date of generating image" are defined in "bill of receipt". Fields of the bibliographic information such as "buy date" and "date of generating image" are automatically input. A date set up in the apparatus is automatically input in "Datetime".

By scanning a document after setting up the bibliographic information of the screen illustrated in FIG. 16 such as "bill of receipt", the setup bibliographic information is associated with the scanned image data and sent to the server 307. The document controlling server 307 stores the bibliographic information given to the delivered image data as the items of the property in association with the image data.

The screen data illustrated in FIG. 11 to FIG. 16 are generated by the screen data generating portion 707 and sent to the MFP 301.

<State Transition>

Next, the state transition of display screens is described. The following explanation is given on a premise that the screen illustrated in FIG. 9 is defined as "Admin_Setting", the screen illustrated in FIG. 10 is defined as "Admin_Setting_AddEdit_Basic", the screen illustrated in FIG. 11 to FIG. 13 is defined as "OperationPanel_FolderSelector", the screen illustrated in FIG. 14 is defined as "OperationPanel_ContentType" and the screen illustrated in FIG. 15 and FIG. 16 is defined as "OperationPanel_FieldInput". "OperationPanel_FieldInput" transits from "FieldInput1" to "FieldInput2" every time the bibliographic information is set in the field.

Figure 17:
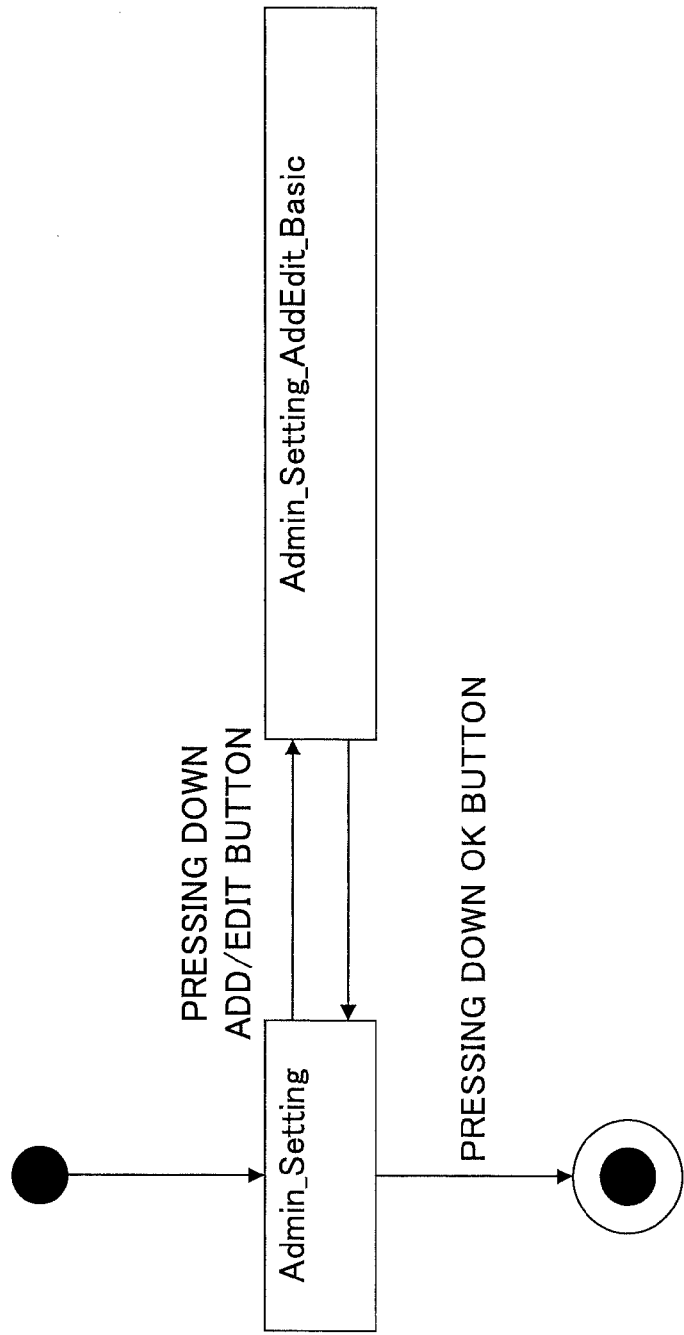
FIG. 17 illustrates an example screen transition for a management tool.

FIG. 17 illustrates an example screen transition for a management tool. Referring to FIG. 17, the administrator registers a server of the delivery destination using the screen "Admin_Setting" illustrated in FIG. 9. The screen data illustrated in FIG. 9 are sent from the delivery server 305 to the information processing terminal 309. If the "Add" or "Edit" button is pressed from the screen illustrated in FIG. 9, the delivery server 305 so informed sends the screen "Admin_Setting_addedit_Basic" illustrated in FIG. 10 to the information processing terminal 309.

As illustrated in FIG. 17, if the "OK" button of the screen "Admin_Setting" illustrated in FIG. 9 is pressed, the setup with the managing tool is completed.

Figure 18:
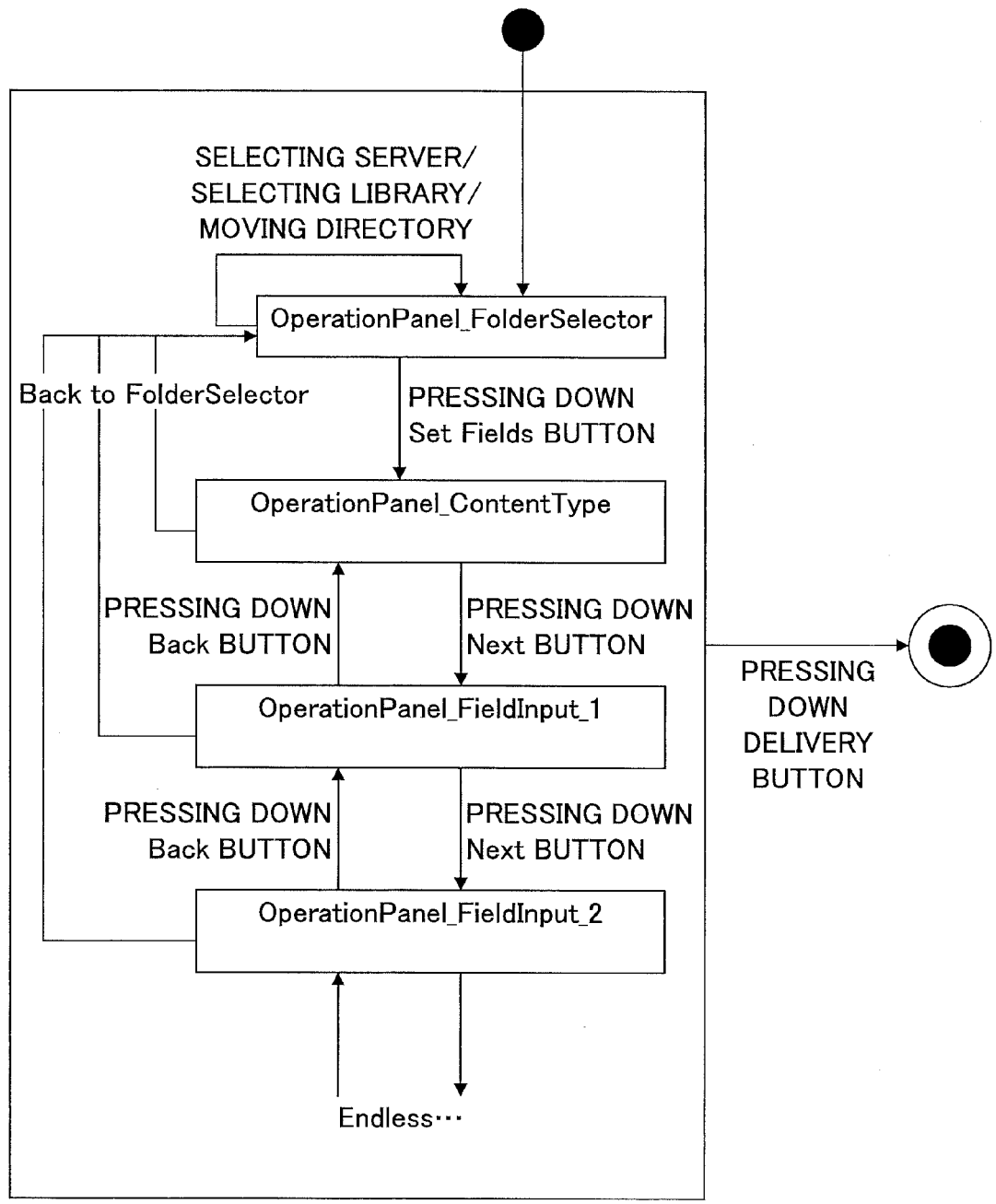
FIG. 18 illustrates an example screen transition of an operations panel.

FIG. 18 illustrates an example screen transition in the operation panel. Referring to FIG. 18, the user selects the sub-folder to be delivered from the screen "OperationPanel_FolderSelector" illustrated in FIG. 11 to FIG. 13. If the "SetFields" button 1301 on the screen illustrated in FIG. 13 is pressed, the screen transits to the screen of the OperationPanel_ContentType".

The "Next" button 1401 of the "OperationPanel_ContentType" illustrated in FIG. 14 is pressed, and the screen transits to the setup screen for the bibliographic information illustrated in FIG. 15 or FIG. 16. With the screen transition illustrated in FIG. 8, the screen transition occurs a number of times the same as the number of the fields of the bibliographic information included in the content type. If the "Back to FolderSelector" button on the screen illustrated in FIG. 14 to FIG. 16 is pressed, the screen illustrated in FIG. 11 is displayed again.

If the content type is changed to another content type on the screen illustrated in FIG. 14, information input by then may be discarded. Further, if the "Back to FolderSelector" button on the screen illustrated in FIG. 14 to FIG. 16 are pressed and another folder is set up, the information such as a field value input by then may be discarded. If the delivery button is pressed by the user, the screen transition illustrated in FIG. 18 is completed.

<Data Type>

Next, the data types of the fields are described. FIG. 19A, FIG. 19B and FIG. 19C illustrate example relationships among data types and associated information of the data types. The example data types of the fields illustrated in FIG. 19A, FIG. 19B and FIG. 19C are "one-line text", "plural-line texts", "option", "numeric value", "currency", "date and time" and so on. Fields "rule of data type", "action if rule is unobserved", "user interface (UI) corresponding to data type" and so on are associated with the data types.

For example, the data type "one-line text" is defined to have "rule of data type" of "255 letters or less", "user interface (UI) corresponding to data type" of "EditBox", and "input rule" of "255 letters or less". Further, the data type "option" is defined to have "rule of data type" of "selecting from setup list", "action if rule is unobserved" of "store as-is", and "user interface (UI) corresponding to data type" of "ComboBox".

The delivery server stores data illustrated in FIG. 19A, FIG. 19B and FIG. 19C. With this, if the delivery server 305 acquires a field and a data type as the bibliographic information from the document controlling server 307, the screen data generating portion 707 refers to the data illustrated in FIG. 19A, FIG. 19B and FIG. 19C and can generate setup screen data of the bibliographic information in which the user interface or the limitation of the fields are set up.

When the data illustrated in FIG. 19A, FIG. 19B and FIG. 19C are stored in the document controlling server 307, it is unnecessary for the delivery server to always hold the data illustrated in FIG. 19A, FIG. 19B and FIG. 19C. The data illustrated in FIGS. 19A, 19B and 19C may be acquired at the time of acquiring the bibliographic information from the document controlling server 307.

<Operations>

Figure 20:
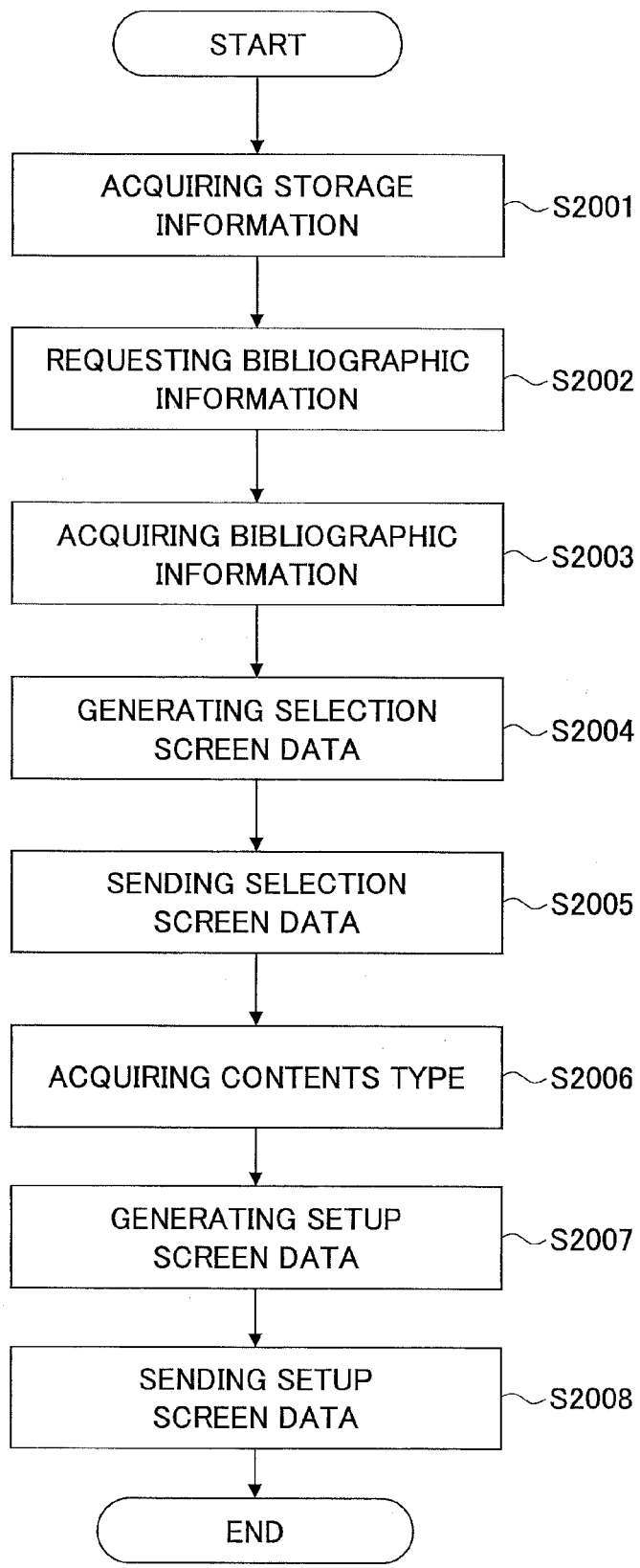
FIG. 20 is a flowchart of an example screen control process for server delivery of Embodiment 1.

Next, the function of the delivery server 305 is described. FIG. 20 is a flowchart of an example screen control process for server delivery of Embodiment 1.

In step S2001 illustrated in FIG. 20, the communicating portion 703 receives storage information indicative of a delivery destination from the MFP 303. The storage information may include a URL of the delivery destination. When the identification information indicative of the delivery destination and the URL of the delivery destination are associated and managed, the communicating portion 703 receives identification information indicative of the delivery destination as the storage information.

In step S2002, when the bibliographic information requesting portion 705 detects acquisition of the storage information by the communicating portion 703, the bibliographic information requesting portion 705 requests a registered library, a folder, a contents type defined in the folder, and an acquisition request for bibliographic information defined in the contents type via the communicating portion 703 depending on the situation. The communicating portion 703 may receive all of the above-described information at once or acquire predetermined information every time the information is requested by the MFP 301.

In step S2003, the communicating portion 703 acquires the above described library, folder, contents type and the bibliographic information from the delivery server.

In step S2004, the screen data generating portion 707 causes the acquired one or plural contents types to be selectable, and generates the selection screen data for selecting the contents type in FIG. 14.

In step S2005, the communicating portion 703 sends the selection screen data generated by the screen data generating portion 707 to the MFP 301.

In step S2006, the communicating portion 703 receives the contents type selected by the user and outputs the contents type to the screen data generating portion 707.

In step S2007, the screen data generating portion 707 generates the setup screen data for setting one or plural bibliographic information pieces defined in the selected contents type as illustrated in FIG. 15 and FIG. 16.

In step S2008, the communicating portion 703 sends the setup screen data generated by the screen data generating portion 707 to the MFP 301.

It is possible to change the communicating portion 703, the bibliographic information requesting portion 705, and the screen data generating portion 707 to be plug-in screen control programs and install the plug-in screen control programs in the delivery server 305. With this, the above-described process can also be carried out.

With Embodiment 1, a user can select the contents type defined in the folder of the delivery destination and the bibliographic information contained in the selected contents type can be set. Further, the bibliographic information set by the MFP 301 is associated with the bibliographic information of the server of the delivery destination. The server of the delivery destination can set the bibliographic information given to the delivered image data in the bibliographic information managed by the own server.

The administrator of the delivery server 305 may only set a server of the delivery destination. Therefore, it is possible to drastically reduce the burden in associating the bibliographic information. The delivery server 305 need not hold the bibliographic information defined in the document controlling server 307 in fields of the input screen of the bibliographic information one-by-one. A memory used for the association can be omitted and a memory source can be effectively used.

Embodiment 2

Next, the delivery server of Embodiment 2 is described. With Embodiment 2, it is possible to edit, add or delete the bibliographic information.

<Function>

Figure 21:
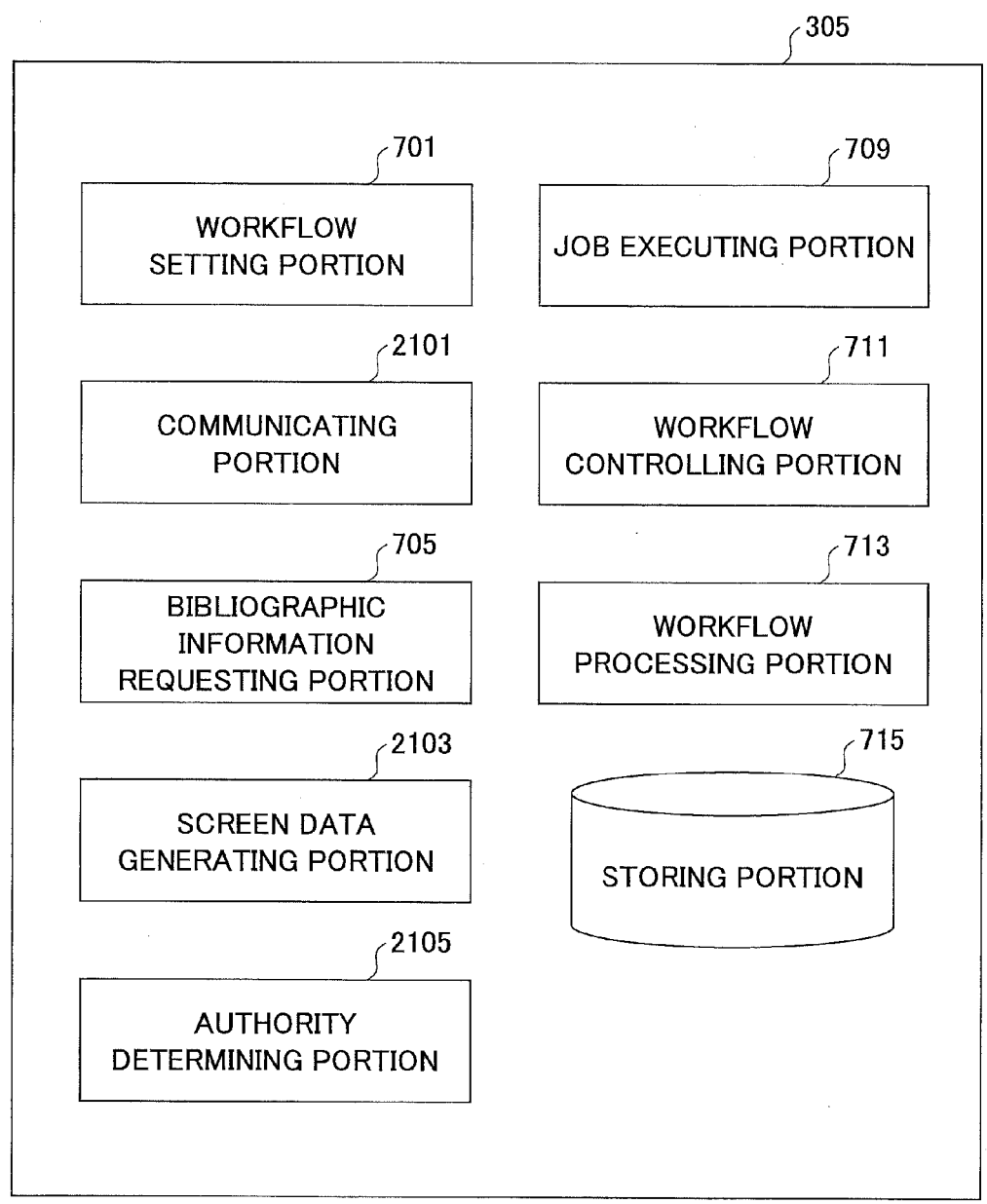
FIG. 21 illustrates an example block chart of a delivery server function of Embodiment 2.

FIG. 21 is a block chart illustrating an example function of the delivery server of Embodiment 2. Referring to FIG. 21, the identical numerical references are used for functions similar to those in FIG. 7, and description of these functions is omitted. The delivery server 305 includes a communicating portion 2101, a screen data generating portion 2103, and an authority determining portion 2105. Hardware of the delivery server in Embodiment 2 may be similar to hardware of the delivery server in Embodiment 1.

The communicating portion 2101 may be realized by controlling the network I/F unit 509 with the control unit 501. The screen data generating portion 2103 and the authority determining portion 2105 may be realized by the control unit 501 and the main memory unit 503.

The screen data generating portion 2103 generates setup screen data for setting the bibliographic information. The screen data generating portion 2103 generates setup and edit screen data so that the bibliographic information is edited from the setup screen data. The setup and edit screen data can add and delete fields of the bibliographic information or change a field name of the bibliographic information. The setup screen data may be generated by the screen data generating portion 2103 when the instruction to edit the bibliographic information is sent from the MFP 301 to the delivery server 305.

FIG. 22 illustrates example setup data of Embodiment 2. An "Edit" button 2201 is included in the setup screen data illustrated in FIG. 22. When the "Edit" button 2201 is pushed, the MFP 301 instructs the delivery server 305 to edit the bibliographic information. When the delivery server 305 is instructed to edit the bibliographic information by the MFP 301, the setup and edit screen data for editing the bibliographic information are generated by the screen data generating portion 2103. The delivery server 305 sends the generated setup and edit screen data to the MFP 301.

The MFP 301 displays the setup and edit screen data and receives the edited bibliographic information. The bibliographic information can be added, deleted and modified using a setup and edit screen. With the setup and edit screen, a predetermined field of the bibliographic information may be indicated and deleted, a new field may be added, the data type of a field may be designated, and a field name may be modified.

Next, the delivery server 305 limits a user to whom the setup and edit screen data is presented.

The communicating portion 2101 receives user information of the user who logs in from the MFP 301. The received user information is output to the authority determining portion 2105. The delivery server 305 sends an acquisition request for administrator information to the document controlling server 307. The communicating portion 2101 receives the administrator information of the document controlling server 307. The received user information is output to the authority determining portion 2105. The administrator information includes a user name of the administrator or a user name of a user admitted by the administrator.

The authority determining portion 2105 determines whether the user who has logged in on the MFP 301 is the administrator or the user admitted by the administrator. For example, the authority determining portion 2105 determines whether there is a user name corresponding to the acquired user information in the administrator information. The authority determining portion determines that the user has authority when the login user name is included in the administrator information.

The authority determining portion 2105 sends a result of determining the logged-in user of the MFP 301 to the screen data generating portion 2103.

The screen data generating portion 2105 generates the setup and edit screen data only if the logged-in user of the MFP 301 has the authority. If the logged-in user does not have the authority, the setup and edit screen data are not generated.

With this, in response to the authority of the logged-in user of the MFP 301, the delivery server 305 can determine whether the bibliographic information is permitted to be added, deleted or modified.

<Operations>

Figure 23:
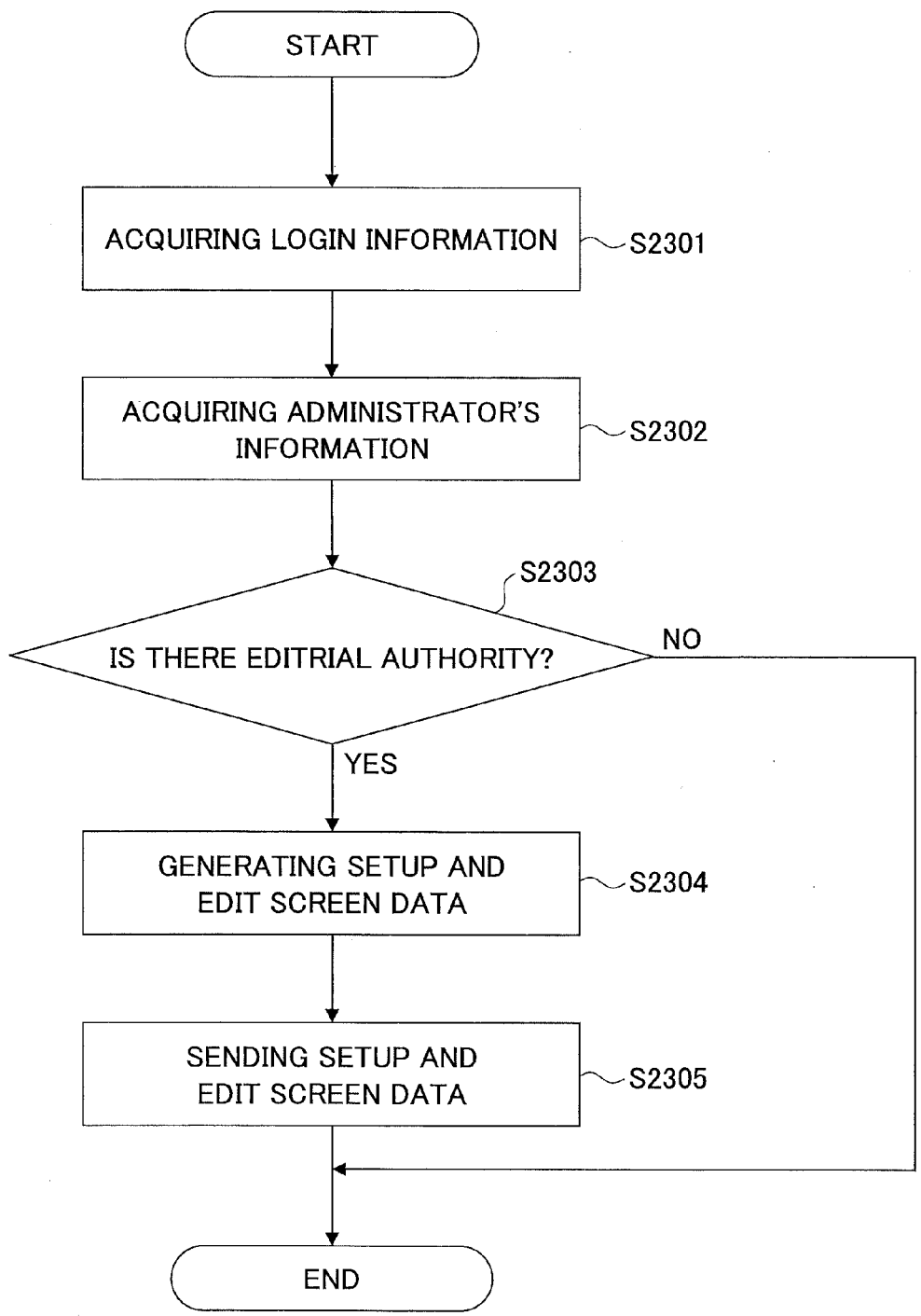
FIG. 23 is a flowchart of an example edit screen data generating process of Embodiment 2.

Next, the delivery server of Embodiment 2 is described. FIG. 23 is a flowchart illustrating a generation process of the setup and edit screen data of Embodiment 2.

In step S2301 illustrated in FIG. 23, the communicating portion 2101 acquires user information of a user who logs in via the MFP 301.

In step S2302, the communicating portion 2101 acquires the administrator information from the document controlling server 307.

In step S2303, the authority determining portion 2105 determines whether a user name corresponding to the user information of a user who has logged in on the MFP 301 is included in the administrator information. If the user name of the user who has logged in is included in the administrator information, the process goes to step S2304, and if the user name of the user who has logged in is not included in the administrator information, the process ends.

Is step S2304, the screen data generating portion 2103 generates the setup and edit screen data enabling editing of the bibliographic information.

In step S2305, the communicating portion 2102 sends the generated setup and edit screen data to the MFP 301.

Meanwhile, it is possible to change the process illustrated in FIG. 23 to a plug-in screen control program of Embodiment 1. By installing the screen control program in the delivery server 305, the above process is executable.

With Embodiment 2, it is possible to edit, add or delete the bibliographic information using the MFP. Further, the logged-in user of the MFP may be determined to be the administrator. If the logged-in user is not the administrator, the logged-in user is not allowed to edit the bibliographic information.

(Modified Example)

Next, a MFP in the modified example is described. In the modified example, the above-described delivery server is assembled in the MFP. Functions of the MFP in which the delivery server is assembled in the modified example are basically similar to the functions of the MFP illustrated in FIG. 6 and the functions of the delivery server illustrated in FIG. 7. The MFP alone of the modified example can carry out the processes described in Embodiments.

Programs to be executed in the delivery server of Embodiments 1 and 2 and the MFP of the modified example may be provided by being recorded in a computer readable recording medium such as a CD-ROM, a flexible disk (FD), a CD-R, and a Digital Versatile Disk (DVD) in the form of files which can be installed in or executed by a computer.

The programs executed by the delivery server of Embodiments 1 and 2 and the MFP of the modified example maybe stored in a computer connected to a network such as the Internet and enabled to be installed via the network. Further, the programs executed by the delivery server of Embodiments 1 and 2 and the MFP of the modified example may be served or distributed via a network such as the Internet.

Further, the programs executed by the delivery server of Embodiments 1 and 2 and the MFP of the modified example may be previously stored in a ROM or the like so as to be provided.

The program executed by the delivery server of Embodiments 1 and 2 and the MFP of the modified example may have a module structure in which the above described units and portions are included. Actual hardware is constructed such that a processor (CPU) reads out a program from the auxiliary memory unit to execute the program, and one or plural of the units and portions are loaded in a main memory to activate the units and portions.

With Embodiment 1, Embodiment 2 and the modified example, the burden on the administrator is relaxed and exhibition of the bibliographic information set up for the user can be changed in response to the bibliographic information set up in the document controlling server which delivers documents to the users.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-118456 filed on May 24, 2010, the entire contents of which are hereby incorporated herein by reference.

What is claimed is:

1. A non-transitory recording medium saving a screen controlling program representing a sequence of instructions, the screen controlling program which when executed by a computer included in an information processing apparatus connected to an image forming apparatus and a document controlling server, causes the computer to perform the following steps:
outputting an acquisition request of a contents type, included in one or plural bibliographic information pieces which are defined in a storage destination of image data indicated by a storage information piece, to the document controlling server if the storage information piece is received from the image forming apparatus;
generating, if one or plural contents types defined in the storage destination are received from the document controlling server, selection screen data for selecting the received one or plural contents types;
sending the generated selection screen data to the image forming apparatus;
generating setup screen data for setting the one or plural bibliographic information pieces included in a selected contents type if the selected contents type is received from the image forming apparatus;
sending the generated setup screen data to the image forming apparatus;
generating setup and edit screen data for editing, adding or deleting the one or plural bibliographic information pieces;
sending the generated setup and edit screen data to the image forming apparatus;
receiving, if a bibliographic information piece is edited, added or deleted by the image forming apparatus, the edited, added or deleted bibliographic information piece from the image forming apparatus;
sending the received bibliographic information piece to the document controlling server;
acquiring, user information indicative of a user who logs in on the image forming apparatus, from the image forming apparatus;
acquiring administrator information indicative of an administrator from the document controlling server; and
determining whether the user indicated by the user information is permitted to edit, add or delete the bibliographic information piece based on the administrator information.

2. A delivery system which delivers image data, output by an image forming apparatus and acquired by an information processing apparatus, to a document controlling server,
wherein the image forming apparatus comprises:
a display unit configured to display the image data acquired from the information processing apparatus; and
a transmission unit configured to send information selected or input based on the image data to the information processing apparatus, and
the information processing apparatus comprises:
a requesting portion configured to output an acquisition request of a contents type, included in one or plural bibliographic information pieces which are defined in a storage destination of image data indicated by a storage information piece, to the document controlling server if the storage information piece is received from the image forming apparatus;
a generating portion configured to generate, if one or plural contents types defined in the storage destination are received from the document controlling server, selection screen data for selecting the received one or plural contents types and setup screen data for setting the one or plural bibliographic information pieces included in a selected contents type if the selected contents type is received from the image forming apparatus;
a sending portion configured to send the generated selection screen data and the generated setup screen data to the image forming apparatus;
a receiving portion configured to receive, if a bibliographic information piece is edited, added or deleted by the image forming apparatus, the edited, added or deleted bibliographic information piece from the image forming apparatus,
an acquiring portion configured to acquire, user information indicative of a user who logs in on the image forming apparatus, from the image forming apparatus and administrator information indicative of an administrator from the document controlling server; and
a determining portion configured to determine whether the user indicated by the user information is permitted to edit, add or delete the bibliographic information piece based on the administrator information,
wherein the generating portion further generates setup and edit screen data for editing, adding or deleting the one or plural bibliographic information pieces, and
the sending portion further sends the generated setup and edit screen data to the image forming apparatus and the received bibliographic information piece to the document controlling server.

3. A screen controlling method carried out in an information processing apparatus connected to an image forming apparatus and a document controlling server, the screen controlling method comprising:
outputting an acquisition request of a contents type, included in one or plural bibliographic information pieces which are defined in a storage destination of image data indicated by a storage information piece, to the document controlling server if the storage information piece is received from the image forming apparatus;

generating, if one or plural contents types defined in the storage destination are received from the document controlling server, selection screen data for selecting the received one or plural contents types;

sending the generated selection screen data to the image forming apparatus;

generating setup screen data for setting the one or plural bibliographic information pieces included in a selected contents type if the selected contents type is received from the image forming apparatus;

sending the generated setup screen data to the image forming apparatus;

generating setup and edit screen data for editing, adding or deleting the one or plural bibliographic information pieces;

sending the generated setup and edit screen data to the image forming apparatus;

receiving, if a bibliographic information piece is edited, added or deleted by the image forming apparatus, the edited, added or deleted bibliographic information piece from the image forming apparatus;

sending the received bibliographic information piece to the document controlling server;

acquiring, user information indicative of a user who logs in on the image forming apparatus, from the image forming apparatus;

acquiring administrator information indicative of an administrator from the document controlling server; and determining whether the user indicated by the user information is permitted to edit, add or delete the bibliographic information piece based on the administrator information.

* * * * *